US012804009B2

(12) United States Patent
Toscano et al.

(10) Patent No.: US 12,804,009 B2
(45) Date of Patent: Nov. 17, 2026

(54) PATH COMPUTATION IN A COMMUNICATION NETWORK

(71) Applicant: Telefonaktiebolaget LM Ericsson (publ), Stockholm (SE)

(72) Inventors: Orazio Toscano, Genoa (IT); Maurizio Pighetti, Genoa (IT); Federico Pasini, Genoa (IT); Francesco Lazzeri, Chiavari (IT); Franco Ferioli, Genoa (IT); Sergio Lanzone, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 19/123,968

(22) PCT Filed: Oct. 24, 2022

(86) PCT No.: PCT/SE2022/050969
§ 371 (c)(1),
(2) Date: Apr. 24, 2025

(87) PCT Pub. No.: WO2024/091149
PCT Pub. Date: May 2, 2024

(65) Prior Publication Data
US 2026/0197341 A1 Jul. 9, 2026

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS 10,044,745 B1 * 8/2018 Jones .................... H04L 63/107
11,838,410 B1 * 12/2023 Ramanathan .......... G06N 10/00
(Continued)

FOREIGN PATENT DOCUMENTS

EP 3410616 A1 12/2018

OTHER PUBLICATIONS

"Common Vulnerability Scoring System version 3.1", Specification Document, Revision 1, <https://www.first.org/cvss/>, Jun. 2019, 1-24.
(Continued)

*Primary Examiner* — SM A Rahman
(74) *Attorney, Agent, or Firm* — Murphy, Bilak & Homiller, PLLC

(57) ABSTRACT

A path computation engine (16) computes a path (14) over which data (12) is to be conveyed in a communication network (10). The path computation engine (16) obtains a vulnerability score set and a remediation level set for each node (10-1 . . . 10-N) that is a candidate for including in the path (14). The vulnerability score set obtained for a node (10-1 . . . 10-N) includes common vulnerability score(s) (20C) for one or more security vulnerabilities applicable to the node (10-1 . . . 10-N), with the common vulnerability score (20C) for a security vulnerability quantifying an extent to which the security vulnerability is exploitable and/or impactful. The remediation level set obtained for a node (10-1 . . . 10-N) includes remediation level(s) (18) for the one or more security vulnerabilities that are applicable to the node (10-1 . . . 10-N), with the remediation level (18) for a security vulnerability quantifying an extent to which the node (10-1 . . . 10-N) has remediated the security vulnerability. The path computation engine (16) computes the path (14) as a function of these vulnerability score set(s) and remediation level set(s).

20 Claims, 13 Drawing Sheets

(56) References Cited

U.S. PATENT DOCUMENTS

| | | | | |
|---|---|---|---|---|
| 2013/0191919 | A1 | 7/2013 | Basavapatna et al. | |
| 2018/0343188 | A1 | 11/2018 | Betge-brezetz et al. | |
| 2020/0285737 | A1* | 9/2020 | Kraus | G06F 21/552 |
| 2023/0370334 | A1* | 11/2023 | Mannengal | H04L 43/04 |

OTHER PUBLICATIONS

"Deprecated SSHv1 Protocol Detection CVE-2001-1473 Scanner", <https://securityforeveryone.com/tools/deprecated-sshv1-protocol-detection-cve-2001-1473>, 2022, 1-3.

Zhang, et al., "MPLS Inter-Autonomous System (AS) Traffic Engineering (TE) Requirements", Network Working Group, Request for Comments: 4216, Nov. 2005, 1-22.

"SSH1 with encryption disabled could allow client authentication to be forwarded", CVE-2001-1473, X-Force Vulnerability, <https://exchange.xforce.ibmcloud.com/vulnerabilities/6603>, 2022, 1-2.

Ao, et al., "Report on DIMACS* Workshop on Large-scale Internet Attacks", Department of Computer Science, Rutgers University, Nov. 30, 2003, 1-12.

Awduche, et al., "Requirements for Traffic Engineering Over MPLS", Network Working Group, Request for Comments: 2702, Sep. 1999, 1-29.

Awduche, et al., "RSVP-TE: Extensions to RSVP for LSP Tunnels", Network Working Group, Request for Comments: 3209, Dec. 2001, 1-61.

Berger, L., "Generalized Multi-Protocol Label Switching (GMPLS) Signaling Resource ReserVation Protocol-Traffic Engineering (RSVP-TE) Extensions", Network Working Group, Request for Comments 3473, Jan. 2003, 1-42.

Farrel, et al., "A Path Computation Element (PCE)—Based Architecture", IETF RFC-4655, Aug. 2006, 1-40.

Lanza, et al., "SSH-1 allows client authentication to be forwarded by a malicious server to another server", VU#684820, Software Engineering Institute CERT Coordination Center—Carnegie Mellon University, Oct. 29, 2001, 1-5.

Le Roux, et al., "Requirements for Inter-Area MPLS Traffic Engineering", Network Working Group, Request for Comments: 4105, Jun. 2005, 1-22.

Lukehart, Mark, "2022 Cyber Attack Statistics, Data, and Trends", Parachute Technology, Jan. 4, 2022, 1-21.

Mende, et al., "Practical Attacks against MPLS or Carrier Ethernet Networks", version 0.9, ERNW, Nov. 24, 2011, 1-35.

Mizrak, et al., "Detecting and Isolating Malicious Routers", IEEE Transactions on Dependable and Secure Computing, vol. 3, No. 3, Jul.-Sep. 2006, 1-15.

Wu, et al., "Risk Assessment Method for Cybersecurity of Cyber-Physical Systems Based on Inter-Dependency of Vulnerabilities", Proceedings of the 2015 IEEE Ieem, 2015, 1-5.

* cited by examiner

| Node number: j | Pj |
|---|---|
| 1 | 0,08 |
| 2 | 0,09 |
| 3 | 0,12 |
| 4 | 0,07 |
| 5 | 0,05 |
| 6 | 0,13 |
| 7 | 0,15 |
| 8 | 0,20 |
| **Total** | **0,74** |

PATH COMPUTATION IN A COMMUNICATION NETWORK

TECHNICAL FIELD

The present application relates generally to a communication network, and relates more particularly to path computation in such a network.

BACKGROUND

Constraint-based path computation supports traffic engineering in connection-oriented communication networks, such as those based on Multi-Protocol Label Switching (MPLS) or Generalized MPLS (GMPLS). See, e.g., RFC3209, RFC3473, RFC2702, RFC4105, RFC4216, and RFC4655. A path computation engine (PCE) (also referred to as a path computation element) in this regard computes a path over which data is to be conveyed over a communication network. The PCE may for example compute the path based on a network graph or topology, taking into account any computational constraints. For example, a PCE may compute a Traffic Engineered Label Switched Path taking into account bandwidth, latency, and/or other constraints applicable to the path service request.

In some cases, such as where network links in a connection-oriented communication network are not under the full control of the network operator or customer of the network operator, the connection-oriented communication network cannot be regarded as fully secure. For example, the connection-oriented communication network may be regarded as vulnerable to security attacks, e.g., denial-of-service attacks, packet sniffing attacks, etc. Some known PCE approaches address this by implementing security-aware path computation. For example, one approach computes a path to include nodes that are more secure against cyber-attacks.

Known approaches to security-aware path computation, however, prove insufficient in a number of respects. Some approaches reactively switch paths only after detecting that the current path has been compromised. Other approaches provide proactive switching before path compromise but prove impractical in terms of complexity, cost, latency, and/or scalability, in part because they rely on metrics that require security audits, assessments, comparison with market benchmarks, log elaborations, etc.

SUMMARY

According to embodiments herein, a path computation engine implements security-aware path computation so as to compute a path with an awareness of how secure each candidate node is against one or more security vulnerabilities. Notably, the path computation engine in some embodiments quantifies how secure a candidate node is against applicable security vulnerabilities accounting for the respective extents to which the candidate node has remediated those applicable security vulnerabilities, e.g., so as to guard or harden the candidate node against the security vulnerabilities being exploitable and/or impactful at the candidate node. Also notable, the path computation engine in some embodiments alternatively or additionally quantifies how secure a candidate node is against applicable security vulnerabilities accounting for the respective extents to which the applicable security vulnerabilities are exploitable and/or impactful. The extent of exploitability and/or impact may be reflected with a common vulnerability score (e.g., Common Vulnerability System Score, CVSS) for each respective security vulnerability, e.g., commonly applicable across different types of security vulnerabilities, different types of nodes, different types of communication networks, different communication network domains, and/or different communication network vendors.

By accounting for vulnerability remediation, security-aware path computation according to embodiments herein advantageously reflects the practical, real-world security risks facing the nodes under consideration for inclusion in the path. Furthermore, exploiting common vulnerability score(s) that are commonly and readily available for retrieval advantageously facilitates simple and cost-effective implementation, scalability with network size, zero-touch automatic vulnerability scoring from the network perspective, and/or quicker reactivity to network variations or security threats.

More particularly, embodiments herein include a method performed by a path computation engine for computing a path over which data is to be conveyed in a communication network. The method comprises obtaining a vulnerability score set and a remediation level set for each of one or more nodes that are candidates for including in the path. The vulnerability score set obtained for a node includes one or more common vulnerability scores for one or more security vulnerabilities applicable to the node, with the common vulnerability score for a security vulnerability quantifying an extent to which the security vulnerability is exploitable and/or impactful. The remediation level set obtained for a node includes one or more remediation levels for the one or more security vulnerabilities that are applicable to the node, with the remediation level for a security vulnerability quantifying an extent to which the node has remediated the security vulnerability. In any event, the method also comprises computing the path as a function of the one or more vulnerability score sets and the one or more remediation level sets.

In some embodiments, computing the path comprises calculating a metric for each of the one or more nodes, and determining the path as a function of the one or more metrics. In one such embodiment, the metric calculated for each node is calculated as a function of the remediation level set and the vulnerability score set obtained for the node. The metric characterizes how secure the node is against the one or more security vulnerabilities that are applicable to the node accounting for the respective extents to which those one or more security vulnerabilities are exploitable and/or impactful and accounting for the respective extents to which the node has remediated those one or more security vulnerabilities.

In some embodiments, for each of the one or more nodes, the metric calculated for that node is independent of any remediation level set obtained for any other node among the one or more nodes.

In some embodiments, for each of the one or more nodes, calculating the metric for a node comprises calculating a vulnerability-specific metric for each of the one or more security vulnerabilities that are applicable to the node, and calculating the metric for the node as a combination of the one or more vulnerability-specific metrics for the node. In one such embodiment, the vulnerability-specific metric for a security vulnerability is calculated as a function of the common vulnerability score and the remediation level for that security vulnerability. The vulnerability-specific metric for the node characterizes how secure the node is against the security vulnerability accounting for the extent to which the security vulnerability is exploitable and/or impactful and accounting for the extent to which the node has remediated the security vulnerability.

In some embodiments, the one or more nodes comprise n nodes, n≥1, wherein the one or more security vulnerabilities that are applicable to the jth node comprise m security vulnerabilities, m>1, wherein the vulnerability-specific metric for the jth node, with j E {1 . . . n}, is calculated as:

$$P_{ij} = \frac{X_{ij}}{Z}$$

where $P_{ij}$ is the vulnerability-specific metric for the jth node and the ith security vulnerability, with i∈{1 . . . m}, $X_{ij}$ is a remediation-aware security parameter that characterizes how secure the jth node is against the ith security vulnerability accounting for the extent to which the node has remediated the ith security vulnerability, and Z is a remediation-independent normalizing factor that is independent of any remediation level obtained for any other node among the one or more nodes.

In some embodiments, the vulnerability-specific metric for the jth node is calculated as:

$$P_{ij} = \frac{X_{ij}}{Z} = \frac{\alpha_{ij} * CVS_i / RE_{ij}}{\sum_{i=1,j=1}^{m,n} \alpha_{ij} * CVS_i},$$

where $CVS_i$ is the common vulnerability score obtained for the ith security vulnerability, $RE_{ij}$ is the remediation level obtained for the jth node and the ith security vulnerability, and $\alpha_{ij}$ is a tuning parameter for the jth node and the ith security vulnerability. In some embodiments, calculating the metric for the node as a combination of the one or more vulnerability-specific metrics for the node comprises calculating the metric for the node as:

$$P_j = \sum_{i=1}^{m} P_{ij}$$

where $P_{ij}$ is the vulnerability-specific metric for the jth node and the ith security vulnerability.

In some embodiments, determining the path as a function of the one or more metrics comprises solving an optimization problem that optimizes one or more criterions for the path, subject to one or more constraints. In one embodiment, the one or more criterions for the path include a security of the path, and optimizing the security of the path comprises maximizing or minimizing the sum of the metrics calculated for the nodes included in the path. In some embodiments, the one or more criterions include a bandwidth of the path and/or a latency of the path, and/or wherein the one or more constraints include a constraint on a bandwidth of the path and/or a constraint on a latency of the path.

In some embodiments, a common vulnerability score is a Common Vulnerability Scoring System, CVSS, score, and obtaining the vulnerability score set for each of the one or more nodes comprises obtaining the vulnerability score set for each of the one or more nodes from a National Vulnerability Database, NVD, published by the National Institute of Standards and Technology, NIST.

In some embodiments, the one or more vulnerability score sets and/or the one or more remediation level sets are obtained dynamically from one or more data repositories, with any given vulnerability score set or remediation level set being obtained upon update or addition of that vulnerability score set or remediation level set by the one or more data repositories, and computing the path comprises updating a previous computation of the path upon obtaining one or more new or updated vulnerability score sets or upon obtaining one or more new or updated remediation level sets.

In some embodiments, a common vulnerability score is a Common Vulnerability Scoring System, CVSS, Base score.

In some embodiments, a common vulnerability score is normalized to have a value between 0 and 1.

In some embodiments, the method further comprises setting up the path computed.

In some embodiments, the path is a label-switched path in a Multi-Protocol Label Switching, MPLS, network or a Generalized MPLS, GMPLS, network.

In some embodiments, the path computation engine is implemented by a Software Defined Network, SDN, controller in an Operational Support System, OSS, for the communication network.

Other embodiments herein include a path computation engine configured to compute a path over which data is to be conveyed in a communication network. The path computation engine is configured to obtain a vulnerability score set and a remediation level set for each of one or more nodes that are candidates for including in the path. The vulnerability score set obtained for a node includes one or more common vulnerability scores for one or more security vulnerabilities applicable to the node, with the common vulnerability score for a security vulnerability quantifying an extent to which the security vulnerability is exploitable and/or impactful. The remediation level set obtained for a node includes one or more remediation levels for the one or more security vulnerabilities that are applicable to the node, with the remediation level for a security vulnerability quantifying an extent to which the node has remediated the security vulnerability. In any event, the path computation engine is also configured to compute the path as a function of the one or more vulnerability score sets and the one or more remediation level sets.

In some embodiments, the path computation engine is configured to perform the steps described above for a path computation engine for computing a path over which data is to be conveyed in a communication network.

In some embodiments, a computer program comprising instructions which, when executed by at least one processor of a path computation engine, causes the path computation engine to perform the steps described above for a path computation engine for computing a path over which data is to be conveyed in a communication network. In some embodiments, a carrier containing the computer program is one of an electronic signal, optical signal, radio signal, or computer readable storage medium.

Other embodiments herein include a path computation engine configured to compute a path over which data is to be conveyed in a communication network, the path computation engine comprising processing circuitry. The processing circuitry is configured to obtain a vulnerability score set and a remediation level set for each of one or more nodes that are candidates for including in the path. The vulnerability score set obtained for a node includes one or more common vulnerability scores for one or more security vulnerabilities applicable to the node, with the common vulnerability score for a security vulnerability quantifying an extent to which the security vulnerability is exploitable and/or impactful.

The remediation level set obtained for a node includes one or more remediation levels for the one or more security vulnerabilities that are applicable to the node, with the remediation level for a security vulnerability quantifying an extent to which the node has remediated the security vulnerability. In any event, the processing circuitry is also configured to compute the path as a function of the one or more vulnerability score sets and the one or more remediation level sets.

In some embodiments, the processing circuitry is configured to perform the steps described above for a path computation engine for computing a path over which data is to be conveyed in a communication network.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
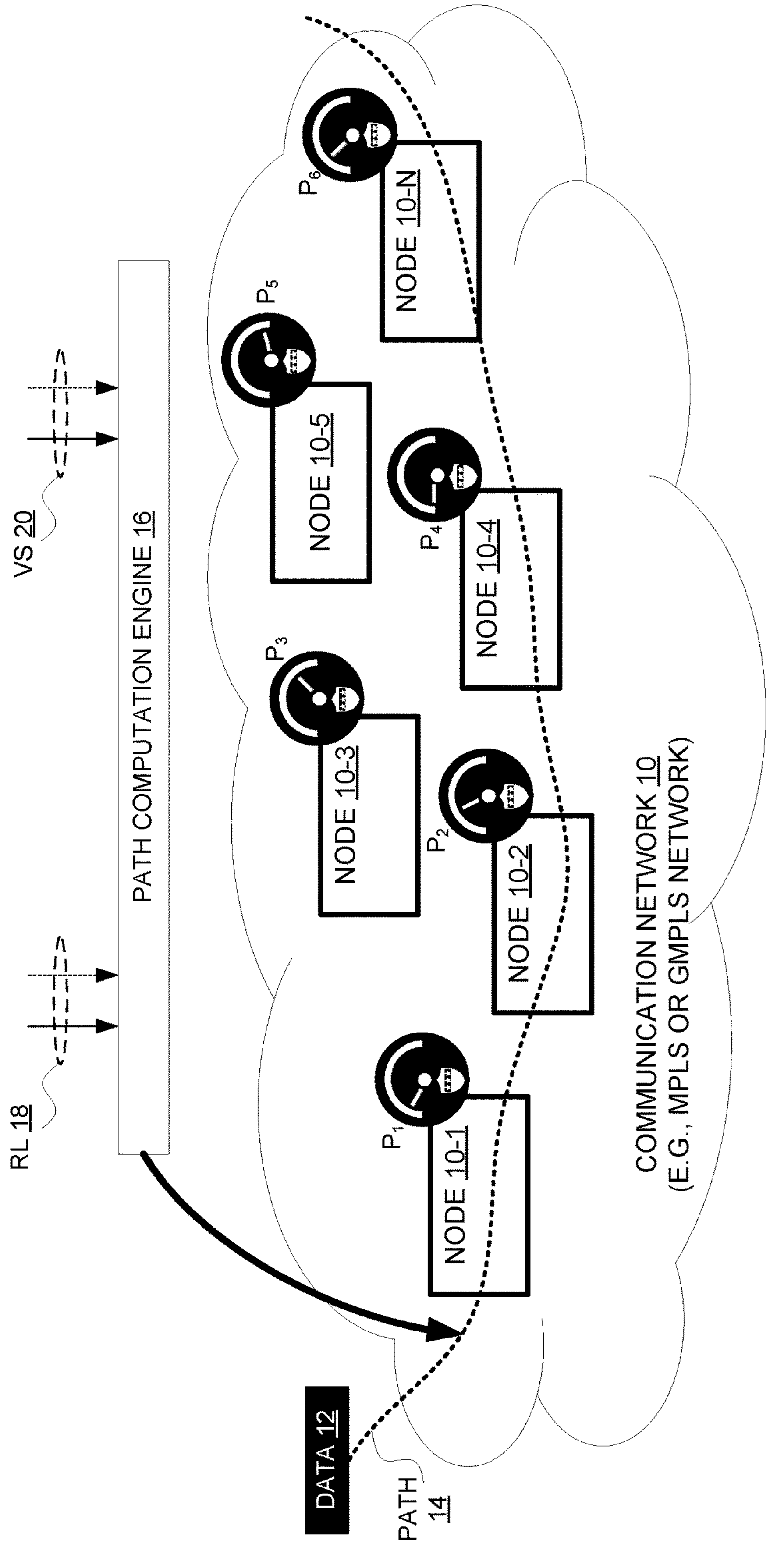
FIG. 1 is a block diagram of a path computation engine configured to compute a path over which data is to be conveyed in a communication network according to some embodiments.

FIG. 1 shows a communication network 10, e.g., a connection-oriented communication network. The communication network 10 conveys data 12 (e.g., of a certain type) over a path 14. As an example, in embodiments where the communication network 10 is a Multi-Protocol Label Switching (MPLS) network or a Generalized MPLS (GMPLS) network, the path 14 is a label-switched path (LSP) over which the communication network 10 conveys data 12 labeled with a certain label mapped to that path 14. Although FIG. 1 shows only a single path as an example, there may be multiple different paths over which different types of data are conveyed, e.g., different types of data may be assigned different labels, with different labels being mapped to different paths.

A path computation engine (PCE) 16 computes the path 14 over which data 12 is to be conveyed. Computing the path 14 in this regard entails determining which one or more of N nodes 10-1 . . . 10-N(e.g., routers) in the communication network 10 are to be included in the path 14 for the data 12. In the example of FIG. 1, for instance, the PCE 16 computes the path 14 for the data 12 by selecting nodes 10-1, 10-2, 10-4, and 10-N from among the N nodes that are candidates for including in the path 14.

According to embodiments herein, the path computation engine 16 implements security-aware path computation so as to compute the path 14 with an awareness of how secure each candidate node is against one or more security vulnerabilities, e.g., where a security vulnerability refers to a type of security attack. In some embodiments, the security of each candidate node is assessed with respect to one or more global security vulnerabilities that are applicable to all candidate nodes. Alternatively or additionally, the security of each candidate node may be assessed with respect to one or more security vulnerabilities that are particularly applicable to that node. Applicability of a security vulnerability to a candidate node may for instance be dictated by the type of the candidate node, e.g., with different types of candidate nodes being inherently susceptible to different types of security vulnerabilities. For example, a vulnerability called Network Time Protocol (NTP) amplification is applicable only to nodes that handle the NTP protocol.

In any event, FIG. 1 shows that the path computation engine 16 in some embodiments calculates a metric PÅ for each candidate node, with j∈{1 . . . . N}, where the metric $P_j$ quantifies how secure the jth candidate node is against one or more security vulnerabilities that are applicable to the node. In this case, the path computation engine 16 may determine the path 14 as a function of the metric(s) $P_j$ calculated for the candidate node(s). For example, in embodiments where the metric $P_j$ for each candidate node reflects the probability that the candidate node will fall victim to a security vulnerability, the path computation engine 16 may select for inclusion in the path 14 whichever combination of candidate node(s) minimizes the sum of the metric(s) $P_j$ calculated for the nodes included in the path 14.

Notably, the path computation engine 16 in some embodiments quantifies (e.g., with metric $P_j$) how secure a candidate node is against applicable security vulnerabilities accounting for the respective extents to which the candidate node has remediated those applicable security vulnerabilities. The extent to which a candidate node has remediated a security vulnerability may be quantified with a so-called remediation level (RL). FIG. 1 in this regard shows that the path computation engine 16 may compute the path 14 as a function of remediation level(s) 18. A candidate node's remediation level 18 for a security vulnerability may reflect the extent to which the candidate node has in fact proactively addressed or mitigated the security vulnerability, e.g., so as to guard or harden the candidate node against the security vulnerability being exploitable and/or impactful at the candidate node. Remediation of a security vulnerability at the candidate node may for example involve applying software patches and/or hardware upgrades that make it harder for an attacker to exploit the security vulnerability at the candidate node and/or that make the impact of the security vulnerability (if successfully exploited) smaller at the candidate node. Accordingly, even if a candidate node is intrinsically susceptible to a security vulnerability (e.g., on the basis of the candidate node being of the type that the security vulnerability targets), the path computation engine 16 may nonetheless regard the candidate node as highly secure against that security vulnerability if the candidate node has actually implemented effective remediation measures that mitigate the exploitability and/or impact of the security vulnerability at the candidate node. Note, here, that a remediation level 18 captures the extent to which a candidate node has in fact remediated a security vulnerability, as opposed to the general availability of measures to remediate the security vulnerability. By accounting for vulnerability remediation in this way, security-aware path computation according to embodiments herein advantageously reflects the practical, real-world security risks facing the nodes under consideration for inclusion in the path 14.

Also notable, the path computation engine 16 in some embodiments alternatively or additionally quantifies (e.g., with metric $P_j$) how secure a candidate node is against applicable security vulnerabilities accounting for the respective extents to which the applicable security vulnerabilities are exploitable and/or impactful, e.g., in an intrinsic sense apart from any remediation. The extent to which a security vulnerability is exploitable and/or impactful may be quantified with a so-called vulnerability score (VS), e.g., with a larger score indicating more exploitable and/or more impactful. FIG. 1 in this regard shows that the path computation engine 16 may compute the path 14 as a function of vulnerability score(s) 20.

Exploitability of a security vulnerability in this regard refers to the ease and/or technical means by which the vulnerability can be exploited. Exploitability of a security vulnerability may for example reflect (i) how remote (logically and/or physically) from the node an attacker can be in order to successfully exploit the security vulnerability; (ii) how complex successful exploitation of the security vulnerability would be, e.g., in terms of what conditions, if any, beyond the attacker's control must exist in order for the attacker to successfully exploit the vulnerability; (iii) the level of privileges an attacker must possess before successfully exploiting the vulnerability; and/or (iv) whether a human user other than the attacker is required to participate in order for the security vulnerability to be exploited. In one embodiment, the more intrinsically exploitable a security vulnerability, the higher the vulnerability score 20 for that security vulnerability.

The impact of a security vulnerability, by contrast, refers to the effect of a successfully exploited security vulnerability on the node. The impact of a security vulnerability may for example reflect (i) the impact to the confidentiality of data at the node due to successful exploitation of the security vulnerability; (ii) the impact to the integrity of data at the node due to successful exploitation of the security vulnerability; and/or (iii) the impact to the availability of the node (e.g., as a networked service) due to successful exploitation of the security vulnerability. In one embodiment, the more intrinsically impactful a security vulnerability, the higher the vulnerability score 20 for that security vulnerability.

Regardless, a vulnerability score 20 herein may quantify the extent to which a security vulnerability is exploitable and/or impactful in a way that is commonly applicable across different types of security vulnerabilities, different types of nodes, different types of communication networks, different communication network domains, and/or different communication network vendors. This type of vulnerability score 20 is referred to herein as a common vulnerability score (CVS) 20C. A common vulnerability score 20C may for example use a common scale (e.g., 0 to 10) for quantifying the respective extents to which different types of security vulnerabilities are exploitable and/or impactful, e.g., so that the meaning of the common vulnerability score 20C is the same across different types of security vulnerabilities and the same to different communication network vendors.

Some embodiments exploit the common nature of common vulnerability scores 20C to relieve the path computation engine 16, or even any other entity in the communication network 10, from having to calculate vulnerability scores 20 itself. In fact, according to one or more embodiments, the path computation engine 16 obtains one or more common vulnerability scores 20C by retrieving the common vulnerability score(s) 20C from another entity, e.g., external to the communication network 10. For example, in some embodiments, the path computation engine 16 retrieve common vulnerability score(s) 20C from a database external to the communication network 10. Regardless, exploiting common vulnerability score(s) 20C that are commonly and readily available for retrieval advantageously facilitates simple and cost-effective implementation, scalability with network size, zero-touch automatic vulnerability scoring from the network perspective, and/or quicker reactivity to network variations or security threats.

As one specific example of common vulnerability score(s) 20C, in some embodiments, common vulnerability score(s) 20C take the form of Common Vulnerability Scoring System (CVSS) score(s). Such CVSS score(s) may for instance more specifically be CVSS Base score(s), e.g., as specified by CVSS Version 3.1 Release. Regardless, the path computation engine 16 may retrieve one or more CVSS scores for one or more security vulnerabilities from a National Vulnerability Database (NVD) published by the National Institute of Standards and Technology (NIST). Such CVSS scores are notably free and available worldwide via an open framework.

Note, however, that in some embodiments the path computation engine 16 may modify or otherwise condition retrieved common vulnerability score(s) 20C as needed to make the common vulnerability score(s) 20C suitable for path computation. In one embodiment, for example, the path computation engine 16 normalizes each common vulnerability score 20C to have a value (e.g., between 0 and 1) suitable for path computation.

Generally, then, the path computation engine 16 in FIG. 1 may calculate respective metric(s) $P_1 \ldots P_N$ for candidate node(s) 10-1 . . . 10-N, where the metric $P_j$ quantifies how secure the jth candidate node is against one or more security vulnerabilities that are applicable to the node 10-*j*, accounting for the respective extents to which those one or more security vulnerabilities are exploitable and/or impactful, and/or accounting for the respective extents to which the node 10-*j* has remediated those one or more security vulnerabilities. The path computation engine 16 may then determine the path 14 as a function of the respective metric(s) $P_1 \ldots P_N$ for candidate node(s) 10-1 . . . 10-N.

Figure 2:
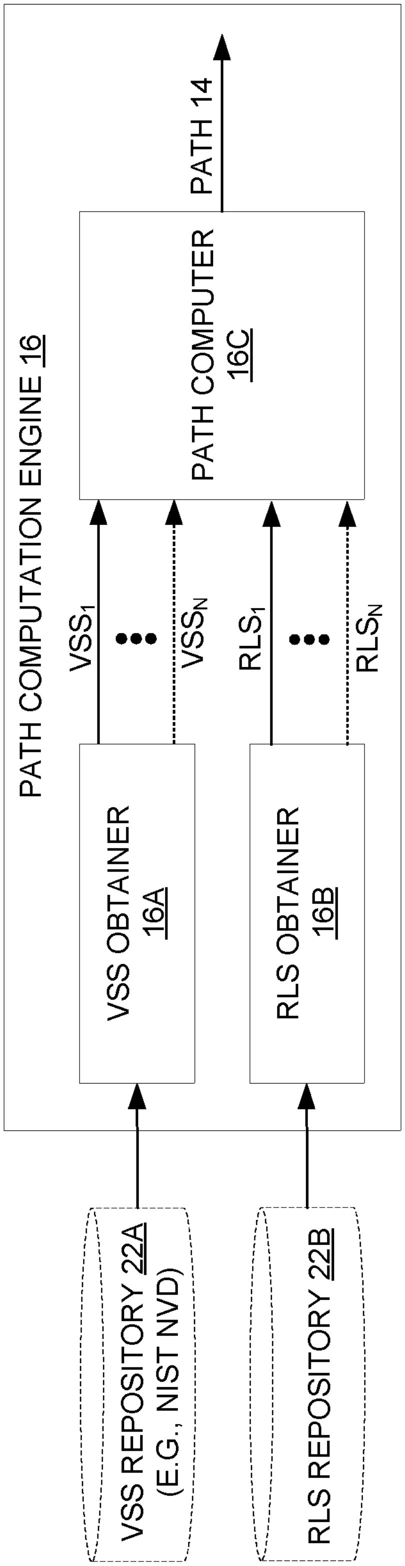
FIG. 2 is a block diagram of a path computation engine configured to compute a path based on vulnerability score set(s) and remediation level set(s) according to some embodiments.

FIG. 2 illustrates additional details of some embodiments herein for computing the path 14. As shown in FIG. 2, the path computation engine 16 includes a vulnerability score set (VSS) obtainer 16A, a remediation level set (RLS) obtainer 16B, and a path computer 16C.

The VSS obtainer 16A as shown obtains a vulnerability score set for each of N nodes that are candidates for including in the path 14, so as to obtain vulnerability score set(s) $VSS_1$ . . . . $VSS_N$ for respective candidate node(s) 10-1 . . . 10-N. The vulnerability score set $VSS_j$ for candidate node 10-*j* includes one or more vulnerability scores 20 (e.g., one or more common vulnerability scores 20C) for one or more security vulnerabilities applicable to the node 10-*j*. The vulnerability score 20 for a security vulnerability quantifies an extent to which the security vulnerability is exploitable and/or impactful, as described above.

In some embodiments as shown, the VSS obtainer 16A retrieves one or more of the vulnerability scores 20 from a VSS repository 22A (e.g., NIST NVD) external to the path computation engine 16, e.g., even external to the communication network 10. In these and other embodiments, for example, the VSS obtainer 16A may retrieve vulnerability scores 20 for all (known) security vulnerabilities, and then obtain the vulnerability score set(s) $VSS_1$ . . . . $VSS_N$ for the N candidate node(s) 10-1 . . . 10-N by identifying which of the retrieved vulnerability scores 20 are applicable to which candidate node(s) 10-1 . . . 10-N, e.g., according to a mapping of node type to applicable security vulnerabilities.

Regardless, the RLS obtainer 16B likewise obtains a remediation level set (RLS) for each of the N nodes that are candidates for including in the path 14, so as to obtain remediation level set(s) $RLS_1$ . . . . $RLS_N$ for respective candidate node(s) 10-1 . . . 10-N. The remediation level set $RLS_j$ for candidate node 10-*j* includes one or more remediation levels 18 for the one or more security vulnerabilities applicable to the node 10-*j*. The remediation level 18 for a security vulnerability quantifies an extent to which the node 10-*j* has remediated the security vulnerability, as described above. In some embodiments as shown, the RLS obtainer 16B retrieves one or more of the remediation levels 18 from a RLS repository 22B external to the path computation engine 16, e.g., even external to the communication network 10.

The path computer 16C computes the path 14 as a function of the vulnerability score set(s) $VSS_1$ . . . . $VSS_N$ and the remediation level set(s) $RLS_1$ . . . . $RLS_N$. In some embodiments, for example, the path computer 16C calculates the metrics $P_1$ . . . . $P_N$ for respective candidate nodes 10-1 . . . 10-N in FIG. 1 as a function of the vulnerability score set(s) $VSS_1$ . . . . $VSS_N$ and the remediation level set(s) $RLS_1$ . . . . $RLS_N$. The path computer 16C then determines the path as a function of the metrics $P_1$ . . . . $P_N$ for respective candidate nodes 10-1 . . . 10-N.

Figure 3:
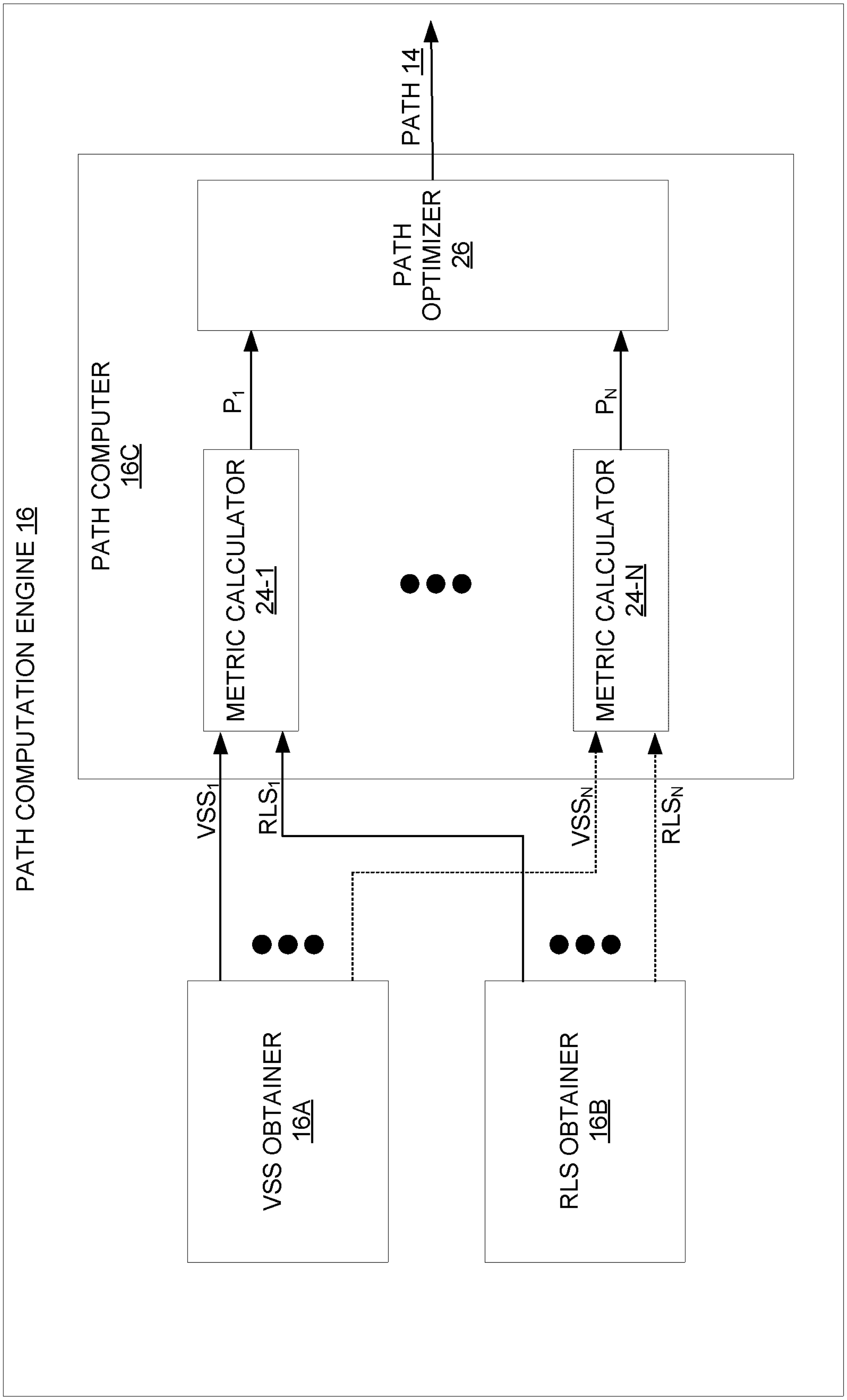
FIG. 3 is a block diagram of a path computation engine configured to compute a path based on metrics calculated for each of one or more nodes that are candidates for including in the path, according to some embodiments.

FIG. 3 illustrates one example. As shown, the path computer 16C includes metric calculators 24-1 . . . 24-N that calculate the metrics $P_1$ . . . . $P_N$ for respective candidate nodes 10-1 . . . 10-N. Metric calculator 24-1 calculates the metric $P_1$ for candidate node 10-1 as a function of the vulnerability score set $VSS_1$ for candidate node 10-1 and the remediation level set $RLS_1$ for candidate node 10-1. And so on, with metric calculator 24-N calculating the metric $P_N$ for candidate node 10-N as a function of the vulnerability score set $VSS_N$ for candidate node 10-N and the remediation level set $RLS_N$ for candidate node 10-N.

Notably, in some embodiments, for each of the candidate node(s) 10-1 . . . 10-N, the metric $P_j$ calculated for that node 10-*j* is independent of any remediation level set obtained for any other node 10-*k* (j≠k) among the candidate node(s) 10-1 . . . 10-N. Advantageously, then, remediation by one node does not impact the metric $P_j$ calculated for another node 10-*j*, e.g., reflecting the reality that the probability of one node falling victim to applicable security vulnerabilities is not changed by the extent to which other nodes remediate against applicable security vulnerabilities.

With the metric(s) $P_1$ . . . . $P_N$ calculated for respective candidate node(s) 10-1 . . . 10-N, a path optimizer 26 in some embodiments determines the path 14 as a function of the metric(s) $P_1$ . . . . $P_N$ by solving an optimization problem. The path optimizer 26 in this regard solves the optimization problem to optimize criterion(s) for the path 14, subject to one or more constraints. Path characteristics such as path bandwidth and/or latency may be accounted for with the criterion(s) or the constraint(s), e.g., the criterion(s) may include a bandwidth of the path 14 and/or a latency of the path 14, or the constraint(s) may include a constraint on a bandwidth of the path 14 and/or a constraint on a latency of the path 14. Regardless, the criterion(s) for the path 14 include the security of the path 14. In one example, optimizing the security of the path 14 entails maximizing or minimizing the sum of the metrics $P_1$ . . . . $P_N$ calculated for the node(s) 10-1 . . . 10-N included in the path 14.

Figure 4:
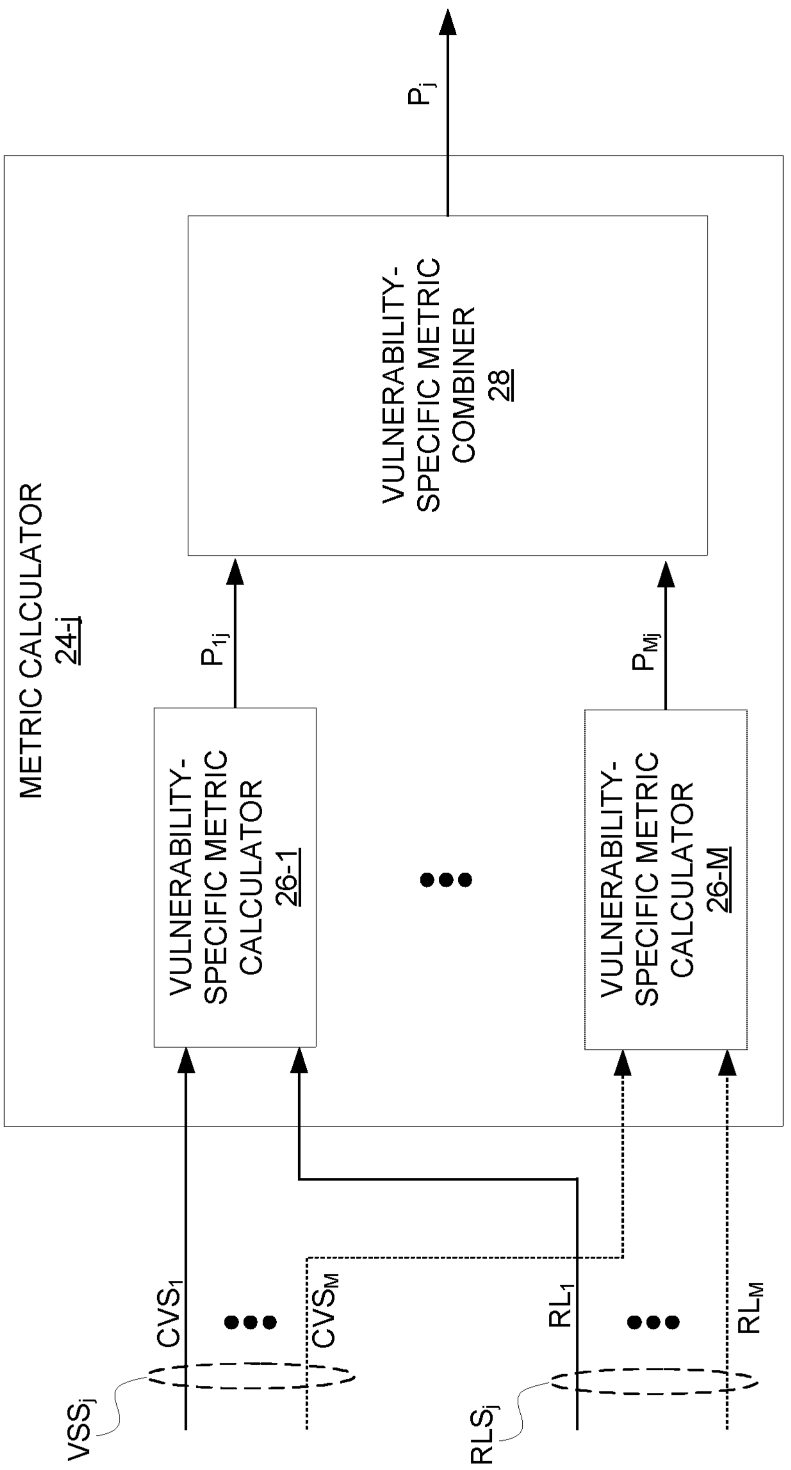
FIG. 4 is a block diagram of a metric calculator configured to calculate a metric for a candidate node, according to some embodiments.

Consider now additional details shown in FIG. 4 for how a metric calculator 24-*j* calculates a metric $P_j$ for a candidate node 10-*j* according to some embodiments. As shown, metric calculator 24-*j* includes vulnerability-specific metric calculator(s) 26-1 . . . 26-M, one for each of M security vulnerabilities (M≥1) that are applicable to the node 10-*j*.

Vulnerability-specific metric calculator 26-1 calculates a vulnerability-specific metric $P_{1j}$ for security vulnerability 1, as a function of the common vulnerability score $CVS_1$ and the remediation level $RL_1$ for security vulnerability 1. This vulnerability-specific metric $P_{ij}$ for security vulnerability 1 characterizes how secure the candidate node 10-*j* is against security vulnerability 1 accounting for the extent to which security vulnerability 1 is exploitable and/or impactful and accounting for the extent to which the node 10-*j* has remediated security vulnerability 1.

And so on, with vulnerability-specific metric calculator 26-M calculating a vulnerability-specific metric $P_{Mj}$ for security vulnerability M, as a function of the common vulnerability score $CVS_M$ and the remediation level RLM for security vulnerability M. This vulnerability-specific metric $P_{Mj}$ for security vulnerability M characterizes how secure the candidate node 10-*j* is against security vulnerability M accounting for the extent to which security vulnerability M is exploitable and/or impactful and accounting for the extent to which the node 10-*j* has remediated security vulnerability M.

As one example, the vulnerability-specific metric $P_{ij}$ for the jth node and the ith security vulnerability may be calculated as:

$$P_{ij} = \frac{X_{ij}}{Z}$$

where $X_{ij}$ is a remediation-aware security parameter that characterizes how secure the jth node is against the ith security vulnerability accounting for the extent to which the security vulnerability is exploitable and/or impactful and accounting for the extent to which the node has remediated the ith security vulnerability, and Z is a remediation-independent normalizing factor that is independent of any remediation level obtained for any other node among the candidate node(s).

In one implementation, for instance, the vulnerability-specific metric $P_{ij}$ for the jth node and the ith security vulnerability may more specifically be calculated as:

$$P_{ij} = \frac{X_{ij}}{Z} = \frac{\alpha_{ij} * CVS_i / RE_{ij}}{\sum_{i=1,j=1}^{m,n} \alpha_{ij} * CVS_i},$$

where $CVS_i$ is the common vulnerability score 20C obtained (and potentially normalized) for the ith security vulnerability, $RE_{ij}$ is the remediation level obtained for the jth node and the ith security vulnerability, and $\alpha_{ij}$ is an optional tuning parameter for the jth node and the ith security vulnerability. Calculating the vulnerability-specific metric $P_{ij}$ in this way notably excludes the remediation level $RE_{ij}$ obtained for the jth node and the ith security vulnerability from the denominator Z, so that the denominator Z functions as a remediation-independent normalizing factor.

Formulating the vulnerability-specific metric $P_{ij}$ for the jth node and the ith security vulnerability in this way means that the vulnerability-specific metric $P_{ij}$ decreases to 0 with a progressive increase in the remediation level(s) $RE_{ij}$. This is true even if the remediation level(s) for other nodes progressively increase.

A vulnerability-specific metric combiner 28 then calculates the metric $P_j$ for a candidate node 10-*j* as a combination of the vulnerability-specific metric calculator(s) 26-1 . . . 26-M. For example, in some embodiments, the vulnerability-specific metric combiner 28 calculates the metric $P_j$ for candidate node 10-*j* as:

$$P_j = \sum_{i=1}^{m} P_{ij}$$

where $P_{ij}$ is the vulnerability-specific metric for the jth node and the ith security vulnerability.

In some sense, the metric $P_j$ for a candidate node 10-*j* can be understood as reflecting the numerical probability that, given that some node of a reference network has become the victim of a security vulnerability, the candidate node 10-*j* has become the victim of a security vulnerability after having applied all remediation measures. The metric $P_j$ for a candidate node 10-*j* may therefore be referred to generally as a relative node attack probability. Indeed, the probability that multiple nodes simultaneously fall victim to a security vulnerability is low. Considering then the typical case where a single node falls victim, events where different nodes fall victim are incompatible, i.e., the victim of a security vulnerability was Node 1 or Node 2 or . . . Node N. This means that the relative node attack probabilities can be treated in an additive way, so that their values can be simply added to achieve the numerical estimation of the full path.

In any event, the path computation engine 16 according to some embodiments computes the path 14 in this way on a periodic or dynamic basis. In fact, in some embodiments, the path computation engine 16 dynamically obtains the vulnerability score set(s) VSS1 . . . . VSSN and the remediation level set(s) RLS1 . . . . RLSN from one or more data repositories, e.g., data repositories 22A, 22B in FIG. 2. The path computation engine 16 may for example obtain any given vulnerability score set or remediation level set upon update or addition of that vulnerability score set or remediation level set by the one or more data repositories, e.g., by subscribing to such updates or additions. In this case, then, the path computation engine 16 may update a previous computation of the path 14 upon obtaining one or more new or updated vulnerability score sets or upon obtaining one or more new or updated remediation level sets.

Figure 5:
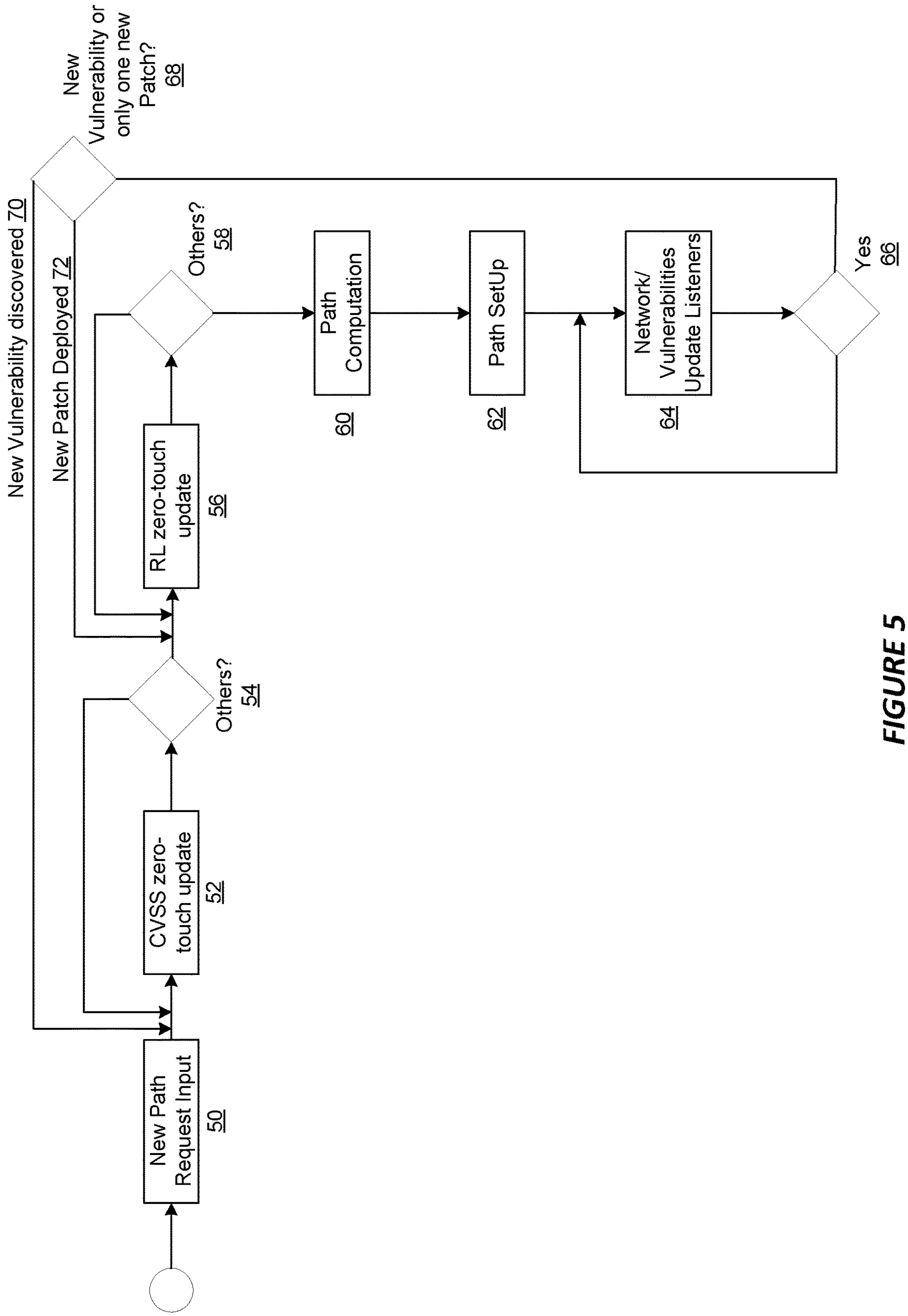
FIG. 5 is a logic flow diagram of a method for updating path computation based on new or updated security vulnerabilities or remediation.

FIG. 5 shows example logic for realizing such dynamic path computation. As shown, the path computation engine 16 receives a new security-aware path computation request (Step 50). In response, the path computation engine 16 performs CVSS zero-touch update(s) in order to automatically update CVSS values for all applicable security vulnerabilities (Steps 52-54). The path computation engine 16 also performs RL zero-touch update(s) in order to automatically update remediation level(s) for all combinations of candidate nodes and applicable security vulnerabilities (Steps 56-58). The path computation engine 16 then performs path computation based on the updated CVSS values and remediation levels per the request (Step 60). After the path is setup (Step 62), though, the path computation engine 16 remains in listening mode (Step 64) to listen for any new or updated CVSS values for any new or existing security vulnerability and/or to listen for any new remediation levels resulting from any new remediation measures (e.g., patch deployment) taken by candidate nodes. If there is any new or updated CVSS value, or any new or updated remediation level, (Step 66) the path computation engine 16 reverts back to the logic for retrieving CVSS values and/or remediation levels. In this regard, the path computation engine 16 may first decide (Step 68) whether there is a new security vulnerability discovered (Step 70) or whether there is only a new patch deployed (no new security vulnerability) (Step 72). If there is a new security vulnerability discovered, the path computation engine 16 re-performs CVSS zero-touch update(s) (Steps 52-54). If there is only a new patch deployed, the path computation engine 16 re-performs RL zero-touch update(s) (Steps 56-58). The path computation engine 16 thereafter re-computes the path 14 with the updated values (Step 60).

Figure 6:
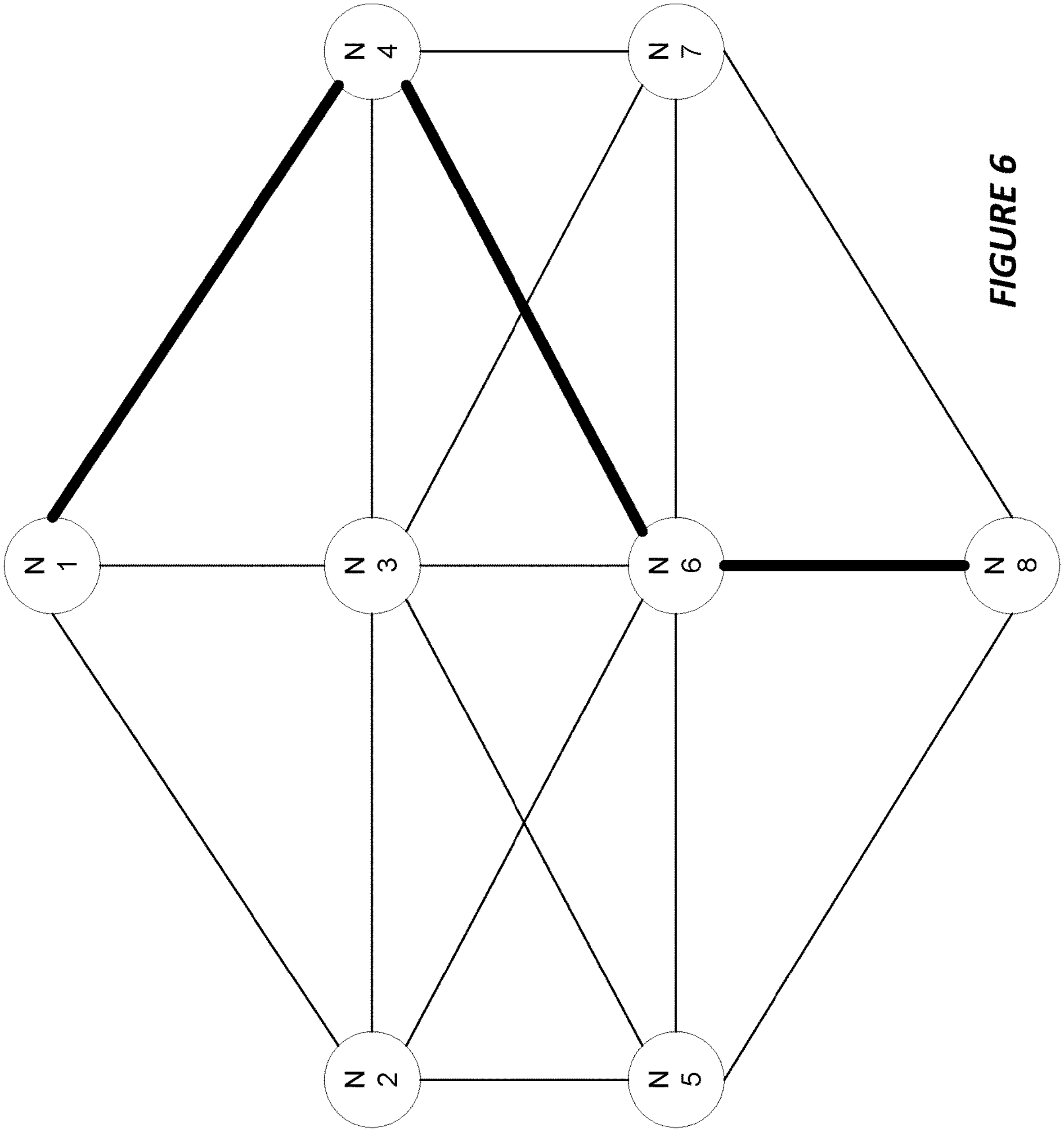
FIG. 6 is a block diagram of a network topology according to some embodiments.

Although FIG. 6 only shows an automatic mode for automatically updating CVSS and RL values, in some embodiments an operator may alternatively or additionally trigger CVSS and/or RL updates manually.

Consider now an example demonstrating some embodiments where the metrics $P_1$ . . . . $P_N$ for the candidate nodes 10-1 . . . 10-N are compatible with existing path computation engine standard algorithms (e.g., Dijkstra). In this example, the metrics $P_1$ . . . . $P_N$ for the candidate nodes 10-1 . . . 10-N are effectively mapped to links of the communication network 10 and their interpretation allows for an additive treatment fully compatible with PCE standard algorithms. This in turn allows for more cost-effective refinements of the PCE installed based and standard usage of proven PCE algorithms, e.g., with no convergence problem.

Figure 7:
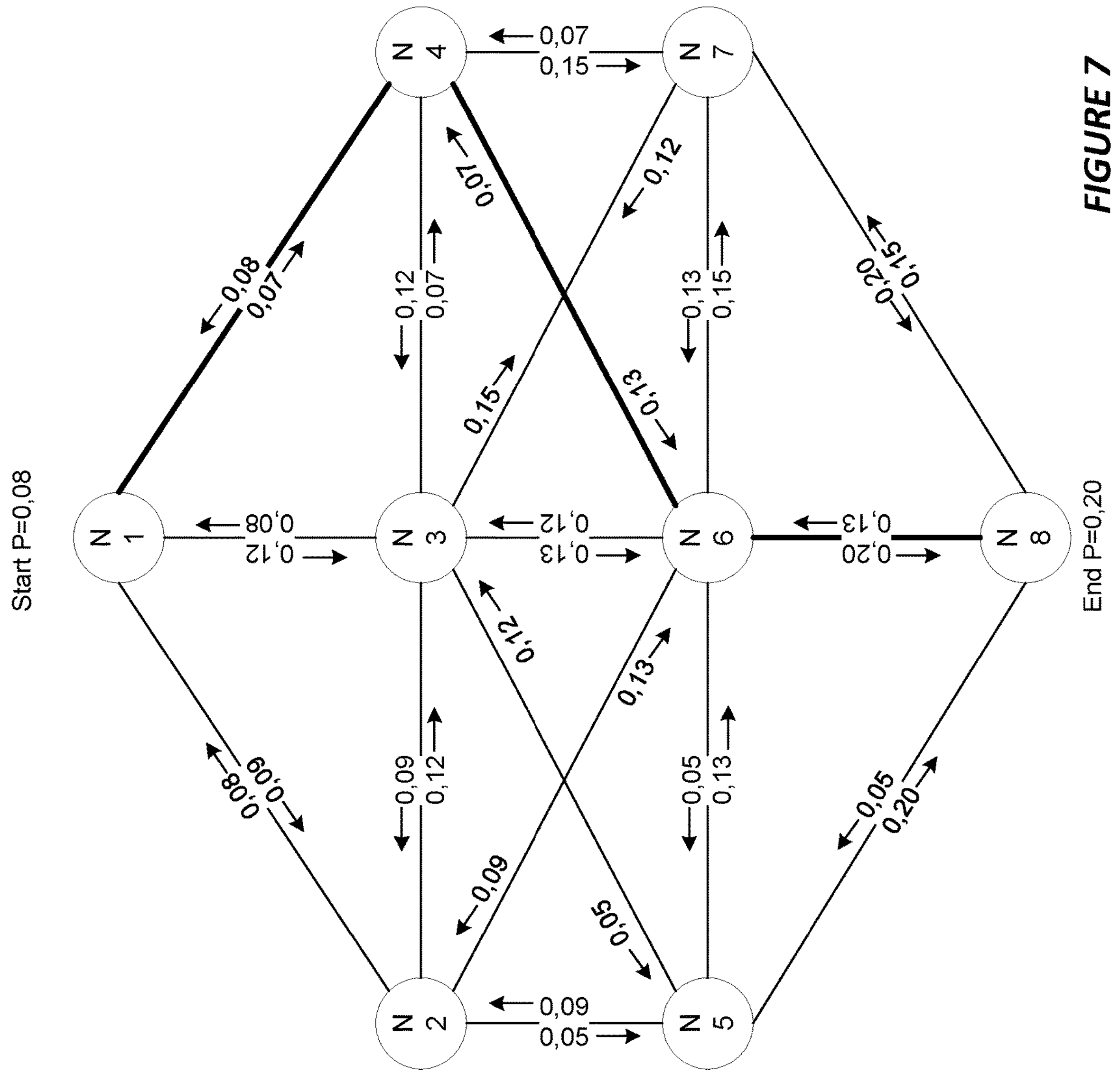
FIG. 7 is a block diagram of the network topology of FIG. 6, with metrics for the nodes in the topology applied to the links in the topology, according to some embodiments.

FIG. 6 shows a simple network topology for this example. In this topology, the communication network includes 8 nodes labeled N1-N8, with different possible paths being candidates for selection. To compute the optimal path, the path computation engine 16 in this example applies the metric $P_j$ for a candidate node 10-*j* to the link(s) that arrive to the node itself. As shown in FIG. 7, for instance, the metric $P_1$ for Node N1 is equal to 0.08, which is applied to the link arriving to Node N1 from Node N2, to the link arriving to Node N1 from Node N3, and to the link arriving to Node N1 from Node N4. Similarly, the metric $P_2$ for Node N2 is equal to 0.09, which is applied to the link arriving to Node N2 from Node N1, to the link arriving to Node N2 from Node N3, to the link arriving to Node N2 from Node N5, and to the link arriving to Node N2 from Node N6. With the metrics for the nodes applied to the links in this way, standard PCE algorithms may be used for path computation on the basis of using additive metrics at the link level, e.g., so as to avoid links associated probability products.

Figure 8:
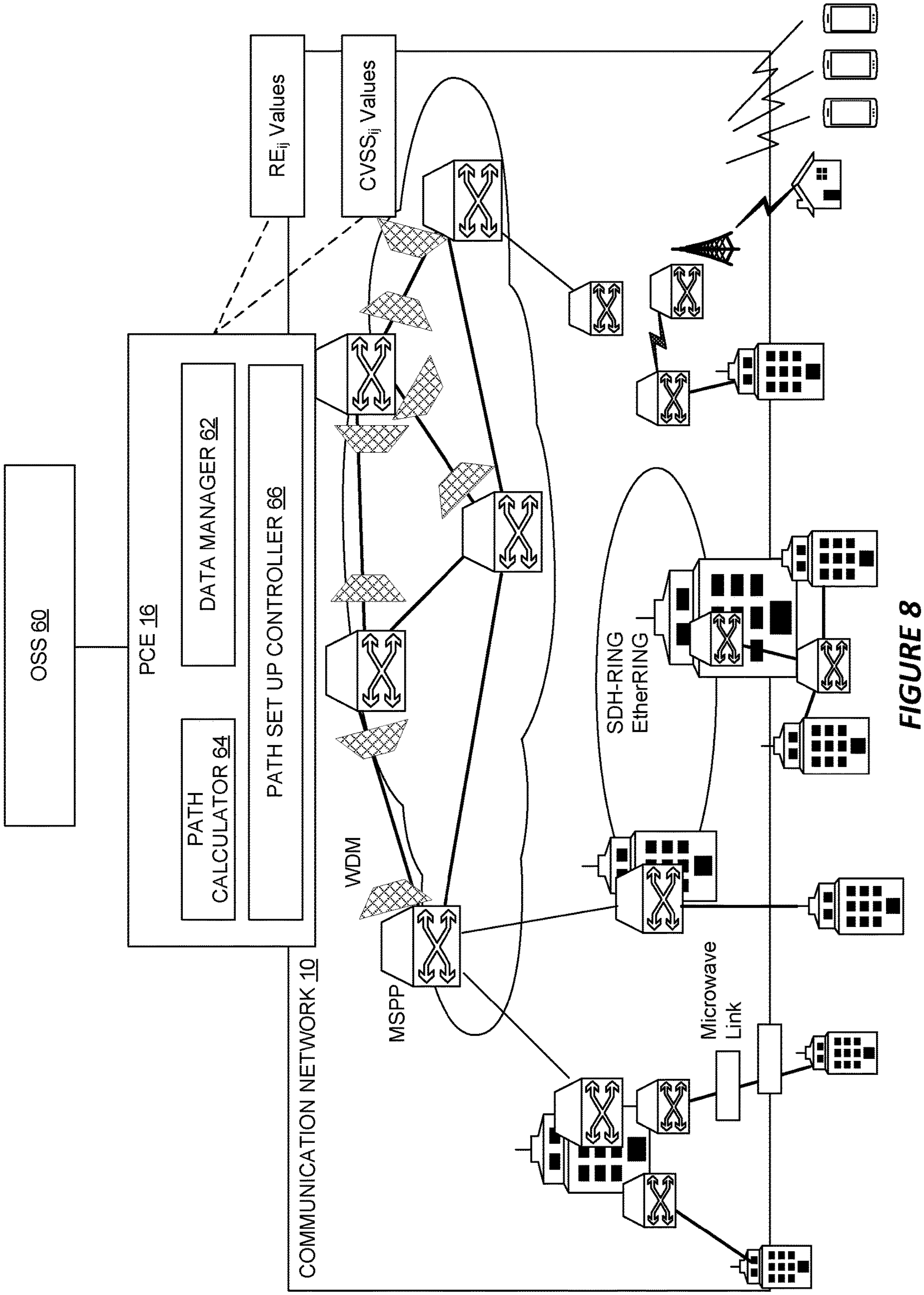
FIG. 8 is a block diagram of a path computation engine as part of a software defined network (SDN) controller according to some embodiments.

In some embodiments, the path computation engine 16 is implemented by a Software Defined Network (SDN) controller in an Operational Support System (OSS) for the communication network 10. FIG. 8 shows one example in a context where the communication network 10 is formed from a Multi-Service Provisioning Platform (MSPP), wave division multiplexers (WDMs), microwave links, synchronous digital hierarchy (SDH) ring(s) and/or EtherRing(s), etc.

As shown in FIG. 8, the communication network 10 is managed by a standard Operational Support System (OSS) 60 that leverages on one (or more) SDN controllers that includes the path computation engine (PCE) 16. The PCE 16 as shown includes a data manager 62, a path calculator 64, and a path set up controller 66. The data manager 62 automatically retrieves the CVSS values and RL values at any variation (any new vulnerability discovered or new available Remediation) and provides the CVSS values and RL values, or the metrics $P_1 \ldots P_N$ calculated therefrom, to the path calculator 64. The path calculator 64 in turn computes the path from the metrics $P_1 \ldots P_N$, e.g., by solving an optimization problem as described above.

Note though that the PCE 16, the OSS system, or the SDN controller in other embodiments may be implemented in the cloud and/or in a virtual environment, e.g., via a virtual network function, VNF.

Figure 9:
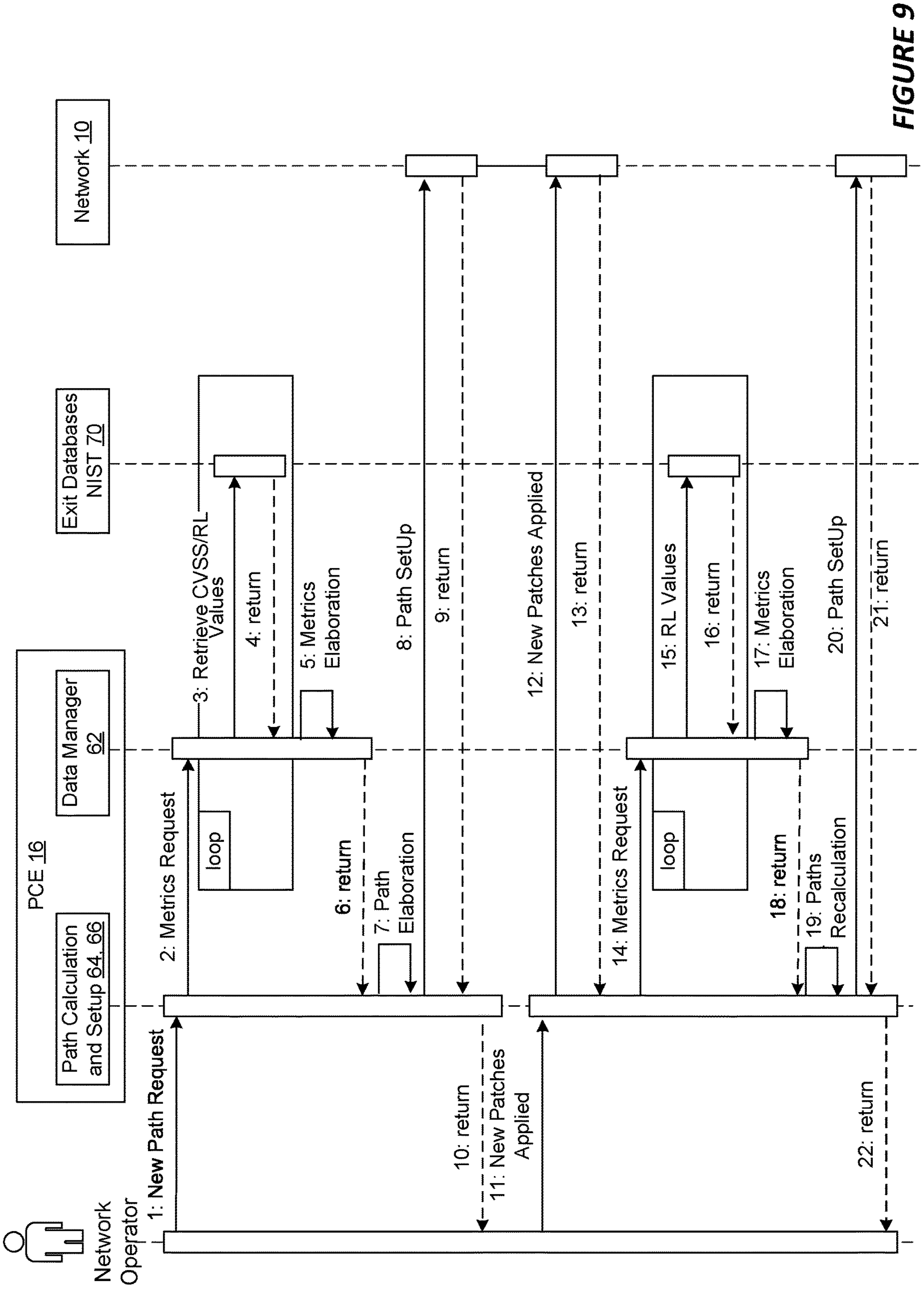
FIG. 9 is a call flow diagram for path computation according to some embodiments.

FIG. 9 shows a call flow diagram for path computation using the architecture of FIG. 8 according to one example embodiment. As shown, the communication network operator issues a new path request (Step 1) to the PCE 16, e.g., as received by the path calculator 64. The path calculator 64 in turn issues a metrics request (Step 2) to the data manager 62, to request metrics $P_1 \ldots P_N$ for the candidate nodes. The data manager 62 retrieves the CVSS values and/or the RL values from external databases (e.g., NIST) 70 (Step 3-4) and calculates (i.e., elaborates) the metrics $P_1 \ldots P_N$ (Step 5). The data manager 62 correspondingly returns the metrics $P_1 \ldots P_N$ to the path calculator 64 responsive to the request (Step 6).

The path calculator 64 calculates the path 14 as a function of the metrics $P_1 \ldots P_N$ (Step 7). In some embodiments, then, the path calculator 64 calculates the best path according not only to bandwidth and/or latency criteria but also security criteria or constraints as reflecting by the metrics $P_1 \ldots P_N$. With the path 14 calculated, the path setup controller performs path setup (Step 8) to set up the path 14 in the communication network 10. In some embodiments, the communication network 10 returns a message (Step 9) indicating whether or not path setup completed successfully. Similarly, in some embodiments, the PCE 16 returns a message (Step 10) to the network operator indicating whether or not setup of the requested path completed successfully.

Meanwhile, the PCe 16 automatically listens and retrieves any variation in the external databases 17 (e.g., NIST). As shown, for example, the network operator may apply new security patches to reinforce security against one or more security vulnerabilities (Steps 11-13). The PCE 16 automatically retrieves the relative parameters in response to this (Steps 14-16), recalculates the path 14 based on the updated parameters (Steps 17-19), and moves the old path to the new path (Steps 20-22) (if configured to do so, otherwise the new path will be simply shown to the operator asking for its decisions).

Note that, in some embodiments, RL database may be filled starting from the evaluations of a CyberSecurity expert team that judges the remediation numerical impact for any new deployed patch. In one or more embodiments, this RL database is made publicly available in order to have a world shared reference similar to the vulnerability score database provided by NIST.

Consider now some practical use cases. As a first use case, a design flaw in the SSH-1 protocol allows a malicious server to establish two concurrent sessions with the same session ID, allowing a man-in-the-middle attack. The impact is that attackers can obtain victim user privileges on other hosts running an SSH-1 server. Remediation measures include upgrading to SSH-2, which is not vulnerable to this attack. In this practical use case, after upgrading node 10-*j* to use SSH-2, the PCE 16 automatically recalculate the path 14. In doing so, the PCE 16 discovers that some candidate paths passing through node 10-*j* were previously discarded because the SSH-1 vulnerability of node 10-*j* had a great impact on the overall calculation. However, the PCE 16 now considers node 10-*j* more secure than previously due to its remediation of the SSH-1 vulnerability. The PCE 16 may therefore compute the path 14 to now include node 10-*j*. According to the network operator preferences, the new path can be automatically applied or simply proposed to the operator waiting for its decisions.

As a second use case, assume that each node in the communication network 10 is a router and that each router has three possible vulnerabilities. The PCE 16 computes the metrics $P_1 \ldots P_N$ for each router taking into account the CVSS values for each vulnerability, but starting with all the $RL_{ij}=1$ (that is, no remediation action in place). In this case, the metrics $P_1 \ldots P_N$ for each router may for example be:

TABLE 1

| Router number: j | Vulnerability Number: i | $RL_i$ | $P_i$ |
|---|---|---|---|
| 1 | 1 | 1 | 0.03 |
| 1 | 2 | 1 | 0.05 |
| 1 | 3 | 1 | 0.04 |
| 2 | 1 | 1 | 0.03 |
| 2 | 2 | 1 | 0.05 |
| 2 | 3 | 1 | 0.04 |
| 3 | 1 | 1 | 0.03 |
| 3 | 2 | 1 | 0.05 |
| 3 | 3 | 1 | 0.04 |
| 4 | 1 | 1 | 0.03 |
| 4 | 2 | 1 | 0.05 |
| 4 | 3 | 1 | 0.04 |
| 5 | 1 | 1 | 0.03 |
| 5 | 2 | 1 | 0.05 |
| 5 | 3 | 1 | 0.04 |
| 6 | 1 | 1 | 0.03 |
| 6 | 2 | 1 | 0.05 |
| 6 | 3 | 1 | 0.04 |
| 7 | 1 | 1 | 0.03 |
| 7 | 2 | 1 | 0.05 |
| 7 | 3 | 1 | 0.04 |
| 8 | 1 | 1 | 0.03 |
| 8 | 2 | 1 | 0.05 |
| 8 | 3 | 1 | 0.04 |

Note that, having no remediation in place, the routers at this step have all the same risks per vulnerability. From Table 1, the metrics $P_1 \ldots P_N$ for the routers may be computed as a sum of the three relative rows.

Now, assume that the first vulnerability is relative to the risk of an attack on a physical location (e.g., Hardware Integrity Attack: CAPEC-CAPEC-440: Hardware Integrity Attack (Version 3.8)) and that, for this reason, the network operator started securing Router1 by hardening the building and rooms and enforcing a security policy on access controls. This will lower the risk but not delete it. If this is assumed to halve the risk, the remediation level may be upgraded to RL=2 for Router1. Correspondingly, for Router1, the first row 0.03 becomes 0.015.

Next, assume that the second vulnerability is relative to the so called "DDOS-NTP amplification attack" (e.g., NTP Amplification Attacks Using CVE-2013-5211, NTP Amplification Attacks Using CVE-2013-5211 | CISA) and that it is possible if the NTP protocol is NTP ≤4.2.4p8/4.2.6. In this case, the network operator starts with Router2, updating its NTP protocol to 4.2.7 and solving the security vulnerability. Solving the security vulnerability upgrades the remediation level RL=100. Therefore, the second row of Router2 changes from 0.05 to a negligible value of 0.0005.

As these examples demonstrate, some embodiments use, for the probabilistic and proactive evaluation of node vulnerability (defined as probability to fall victim of a security vulnerability), a formulation that takes into account: (i) a specific weight of the vulnerability itself (repeated for all the relevant vulnerabilities for that kind of node) combined with (ii) the level of remediation actions (a.k.a. hardening) performed on the node itself to reinforce it against applicable security vulnerabilities. These two factors (summarized for all the node relevant vulnerabilities) are effective values to proactively evaluate the node vulnerability.

Moreover, the numerical vulnerability score reflecting the single vulnerability severity (CVSS) may be freely provided, and continuously updated, e.g., by the Forum of Incident Response and Security Team, Inc. (FIRST). As a consequence, the metrics $P_1 \ldots P_N$ may be based on CVSS values (e.g., automatically retrieved using Web Services technologies), combined with node remediation levels. This advantageously represents an effective, simple and practical choice with multifold advantages. Indeed, some embodiments leverage on a cheap and continuously updated world CVSS database, suited for light and zero-touch automatic elaborations and applications to the network topology, to achieve a very scalable and reactive security-aware path computation engine circuit.

Some embodiments in this regard provide a centralized network management system able to automatically manage the PCE 16 and the related run-time tables (CVSS values and remediation levels), and to modify in real time the optimal security-aware best path at any new vulnerability or new remediation action in order to always provide the best and most secure path. Some embodiments accordingly provide an innovative use and elaboration of the CVSS numerical value, combined with a proper quantification of relative remediation actions, to achieve an effective and significative metric to implement a security-aware path computation. In conjunction, some embodiments provide an innovative full network management sub-system to practically develop a zero-touch real-time implementation of the described PCE 16 with its ancillary sub-modules.

Some embodiments prove advantageous in a number of respects. First, simplicity. Some embodiments are very light and allow a very convenient implementation in terms of costs, reactivity, scalability, and zero-touch automation. Costs are low because some embodiments take advantage of cheap resources for the CVSS automatic retrieving and elaboration operations. Some embodiments are highly reactive due to the low latency with which paths can be computed, e.g., enabling run-time operations following in real time each variation in the communication network 10 or in new discovered vulnerabilities or new introduced remediation actions. Some embodiments are scalable because they are suitable to be applied on the wide modern communication networks. Some embodiments are zero-touch highly automated, e.g., attributable to the web services based automatic retrieval of the CVSS data to the path computation and set up.

Some embodiments also prove advantageous in terms of fairness. According to some embodiments, metrics $P_1 \ldots P_N$ are self-comprehensive, with no need to be composed to a linear combination and no need to run-time manage relative weighs. Some embodiments thereby prove practical with a straightforward physical interpretation overcoming the need to evaluate the fairness of weighted linear combinations.

Some embodiments further prove advantageous due to being based on the real crucial factors impacting path security. With path computation being based on vulnerability exploitability/impact and remediation of those vulnerabilities, some embodiments capture a natural and significative element to proactively evaluate the risk of a node falling victim of a security vulnerability.

Some embodiments moreover prove advantageously compatible with existing PCE algorithms. The metrics $P_1 \ldots P_N$ in some embodiments for example may be effectively mapped to the network links and their physical interpretation allow an additive treatment fully compatible with the PCE standard algorithms. This allows cheaper refinements of the installed base and, most of all, the standard usage of proven path computation algorithms with no convergence problem.

Finally, some embodiments prove advantageous in terms of multi-vendor compatibility. For example, the usage of a worldwide reference for CVSS values will provide a very cheap and reactive solution, offloading the communication network operators to focus about matters that are not in their core business and promising a real-time update in case of every new discovered vulnerability. Furthermore, the usage of a worldwide reference for CVSS values provides a common reference to all vendors and network operators. Therefore, a multi-domain path computation operated by different vendors on different domains will provide a big advantage to handling homogeneous and coherent values.

Figure 10:
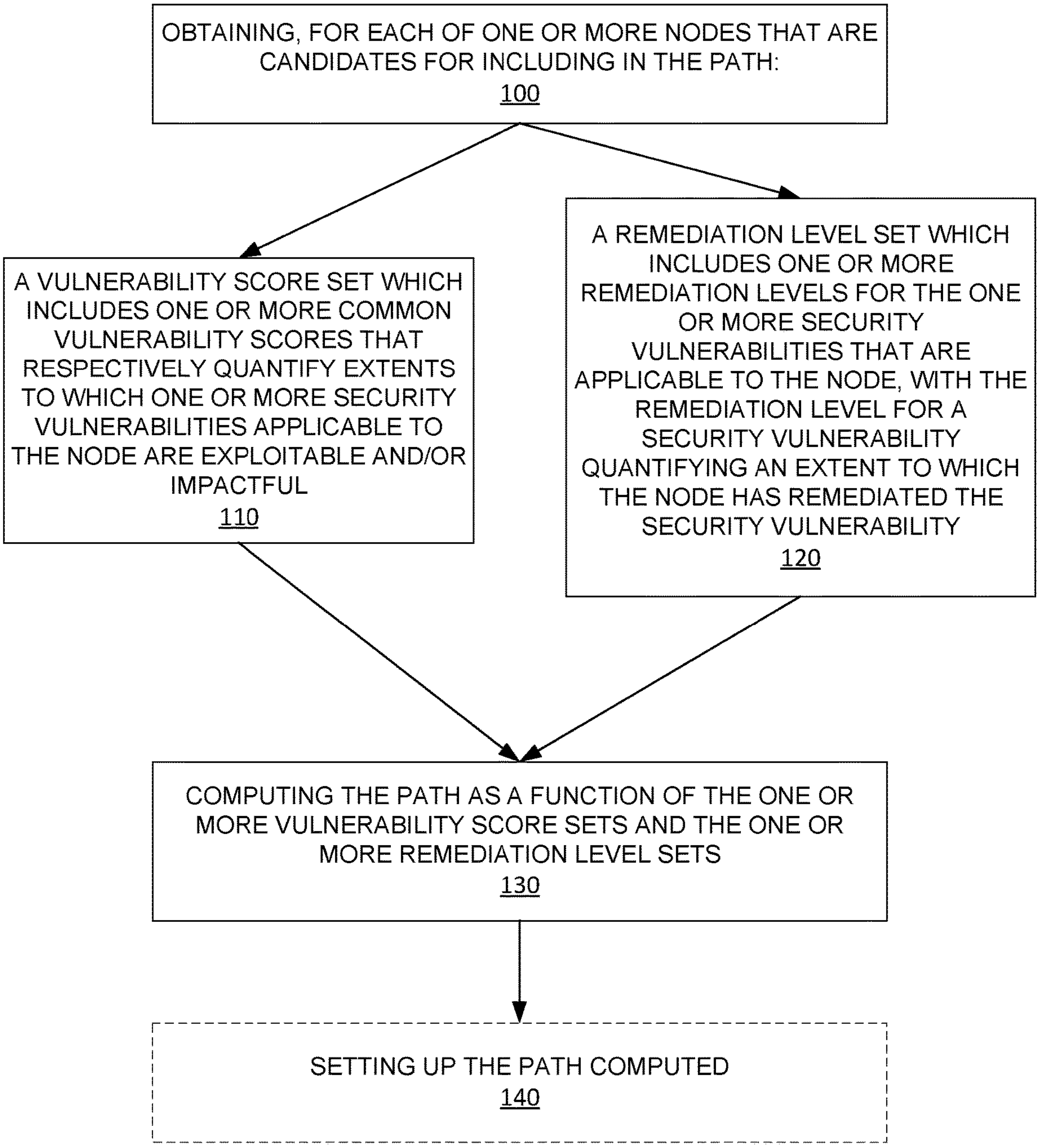
FIG. 10 is a logic flow diagram of a method performed by a path computation engine according to some embodiments.

In view of the modifications and variations herein, FIG. 10 depicts a method performed by a path computation engine 16 for computing a path 14 over which data 12 is to be conveyed in a communication network 10 in accordance with particular embodiments. The method includes obtaining, for each of one or more nodes 10-1 . . . 10-N that are candidates for including in the path 14 (Block 100), a vulnerability score set $VSS_j$ (Block 110) and a remediation level set $RLS_j$ (Block 120). The vulnerability score set $VSS_j$ obtained for a node includes one or more common vulnerability scores 20 for one or more security vulnerabilities applicable to the node, with the common vulnerability score 20 for a security vulnerability quantifying an extent to which the security vulnerability is exploitable and/or impactful. The remediation level set $RLS_j$ obtained for a node includes one or more remediation levels for the one or more security vulnerabilities that are applicable to the node, with the remediation level for a security vulnerability quantifying an extent to which the node has remediated the security vulnerability. In any event, the method also includes computing the path 14 as a function of the one or more vulnerability score sets $VSS_j$ and the one or more remediation level sets $RLS_j$ (Block 130).

In some embodiments, the method further comprises setting up the path 14 computed (Block 140).

In some embodiments, computing the path comprises calculating a metric for each of the one or more nodes, and determining the path as a function of the one or more metrics. In one such embodiment, the metric calculated for each node is calculated as a function of the remediation level set and the vulnerability score set obtained for the node. The metric characterizes how secure the node is against the one or more security vulnerabilities that are applicable to the node accounting for the respective extents to which those one or more security vulnerabilities are exploitable and/or impactful and accounting for the respective extents to which the node has remediated those one or more security vulnerabilities.

In some embodiments, for each of the one or more nodes, the metric calculated for that node is independent of any remediation level set obtained for any other node among the one or more nodes.

In some embodiments, for each of the one or more nodes, calculating the metric for a node comprises calculating a vulnerability-specific metric for each of the one or more security vulnerabilities that are applicable to the node, and calculating the metric for the node as a combination of the one or more vulnerability-specific metrics for the node. In one such embodiment, the vulnerability-specific metric for a security vulnerability is calculated as a function of the common vulnerability score and the remediation level for that security vulnerability. The vulnerability-specific metric for the node characterizes how secure the node is against the security vulnerability accounting for the extent to which the security vulnerability is exploitable and/or impactful and accounting for the extent to which the node has remediated the security vulnerability.

In some embodiments, the one or more nodes comprise n nodes, n≥1, wherein the one or more security vulnerabilities that are applicable to the jth node comprise m security vulnerabilities, m≥1, wherein the vulnerability-specific metric for the jth node, with j∈{1 . . . n}, is calculated as:

$$P_{ij} = \frac{X_{ij}}{Z}$$

where $P_{ij}$ is the vulnerability-specific metric for the jth node and the ith security vulnerability, with i∈{1 . . . m}, $X_{ij}$ is a remediation-aware security parameter that characterizes how secure the jth node is against the ith security vulnerability accounting for the extent to which the node has remediated the ith security vulnerability, and Z is a remediation-independent normalizing factor that is independent of any remediation level obtained for any other node among the one or more nodes.

In some embodiments, the vulnerability-specific metric for the jth node is calculated as:

$$P_{ij} = \frac{X_{ij}}{Z} = \frac{\alpha_{ij} * CVS_i / RE_{ij}}{\sum_{i=1,j=1}^{m,n} \alpha_{ij} * CVS_i},$$

where CVS; is the common vulnerability score obtained for the ith security vulnerability, $RE_{ij}$ is the remediation level obtained for the jth node and the ith security vulnerability, and $\alpha_{ij}$ is a tuning parameter for the jth node and the ith security vulnerability. In some embodiments, calculating the metric for the node as a combination of the one or more vulnerability-specific metrics for the node comprises calculating the metric for the node as:

$$P_j = \sum_{i=1}^{m} P_{ij}$$

where $P_{ij}$ is the vulnerability-specific metric for the jth node and the ith security vulnerability.

In some embodiments, determining the path as a function of the one or more metrics comprises solving an optimization problem that optimizes one or more criterions for the path, subject to one or more constraints. In one embodiment, the one or more criterions for the path include a security of the path, and optimizing the security of the path comprises maximizing or minimizing the sum of the metrics calculated for the nodes included in the path. In some embodiments, the one or more criterions include a bandwidth of the path and/or a latency of the path, and/or wherein the one or more constraints include a constraint on a bandwidth of the path and/or a constraint on a latency of the path.

In some embodiments, a common vulnerability score is a Common Vulnerability Scoring System, CVSS, score, and obtaining the vulnerability score set for each of the one or more nodes comprises obtaining the vulnerability score set for each of the one or more nodes from a National Vulnerability Database, NVD, published by the National Institute of Standards and Technology, NIST.

In some embodiments, the one or more vulnerability score sets and/or the one or more remediation level sets are obtained dynamically from one or more data repositories, with any given vulnerability score set or remediation level set being obtained upon update or addition of that vulnerability score set or remediation level set by the one or more data repositories, and computing the path comprises updating a previous computation of the path upon obtaining one or more new or updated vulnerability score sets or upon obtaining one or more new or updated remediation level sets.

In some embodiments, a common vulnerability score is a Common Vulnerability Scoring System, CVSS, Base score.

In some embodiments, a common vulnerability score is normalized to have a value between 0 and 1.

In some embodiments, the path is a label-switched path in a Multi-Protocol Label Switching, MPLS, network or a Generalized MPLS, GMPLS, network.

In some embodiments, the path computation engine is implemented by a Software Defined Network, SDN, controller in an Operational Support System, OSS, for the communication network.

Embodiments herein also include corresponding apparatuses. Embodiments herein for instance include a path computation engine 16 configured to perform any of the steps of any of the embodiments described above for the path computation engine 16.

Embodiments also include a path computation engine 16 comprising processing circuitry and power supply circuitry. The processing circuitry is configured to perform any of the steps of any of the embodiments described above for the path computation engine 16. The power supply circuitry is configured to supply power to the path computation engine 16.

Embodiments further include a path computation engine 16 comprising processing circuitry. The processing circuitry is configured to perform any of the steps of any of the embodiments described above for the path computation engine 16. In some embodiments, the path computation engine 16 further comprises communication circuitry.

Embodiments further include a path computation engine 16 comprising processing circuitry and memory. The memory contains instructions executable by the processing circuitry whereby the path computation engine 16 is configured to perform any of the steps of any of the embodiments described above for the path computation engine 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 11:
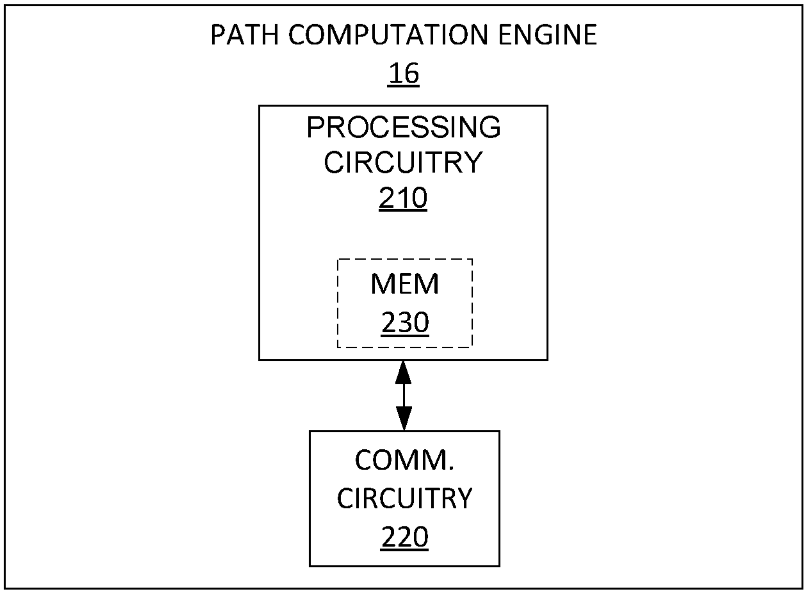
FIG. 11 is a block diagram of a path computation engine according to some embodiments.

FIG. 11 for example illustrates a path computation engine 16 as implemented in accordance with one or more embodiments. As shown, the path computation engine 16 includes processing circuitry 210 and communication circuitry 220. The communication circuitry 220 is configured to transmit and/or receive information to and/or from one or more other nodes, e.g., via any communication technology. The processing circuitry 210 is configured to perform processing described above, e.g., in FIG. 10, such as by executing instructions stored in memory 230. The processing circuitry 210 in this regard may implement certain functional means, units, or modules.

Those skilled in the art will also appreciate that embodiments herein further include corresponding computer programs.

A computer program comprises instructions which, when executed on at least one processor of a path computation engine 16, cause the path computation engine 16 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a path computation engine 16, cause the path computation engine 16 to perform as described above.

Embodiments further include a computer program product comprising program code portions for performing the steps of any of the embodiments herein when the computer program product is executed by a path computation engine 16. This computer program product may be stored on a computer readable recording medium.

Figure 12:
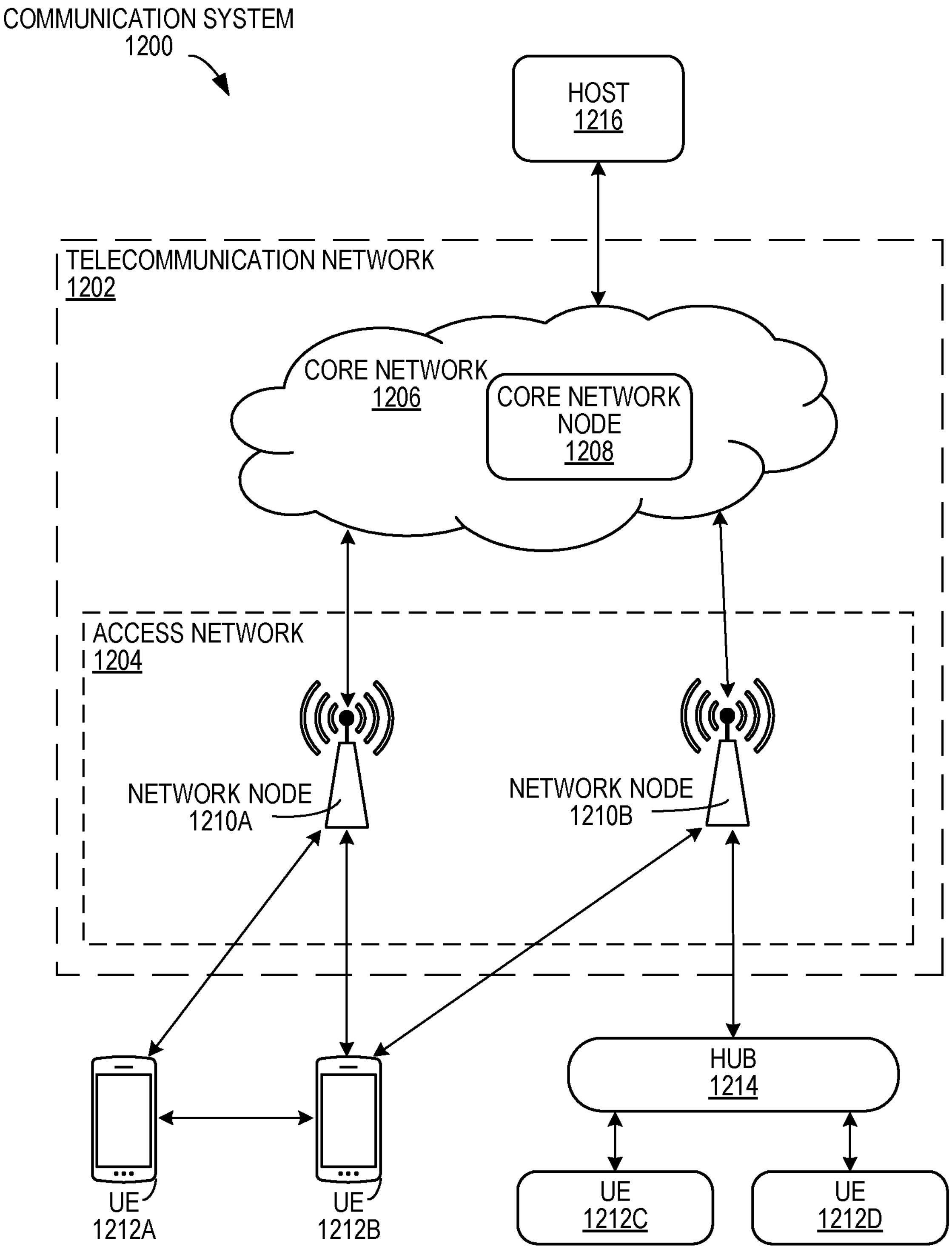
FIG. 12 is a block diagram of a communication system in which path computation is applicable according to some embodiments.

FIG. 12 shows an example of a communication system 1200 for some embodiments herein may be implemented.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210*a* and 1210*b* (one or more of which may be generally referred to as network nodes 1210), or any other similar $3^{rd}$ Generation Partnership Project (3GPP) access node or non-3GPP access point. The network nodes 1210 facilitate direct or indirect connection of user equipment (UE), such as by connecting UEs 1212*a*, 1212*b*, 1212*c*, and 1212*d* (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212*c* and/or 1212*d*) and network nodes (e.g., network node 1210*b*). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210*b*. The hub 1214 may also allow for a different communication scheme and/or schedule between the hub 1214 and UEs (e.g., UE 1212*c* and/or 1212*d*), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210*b*. In other embodiments, the hub 1214 may be a non-dedicated hub—that is, a device which is capable of operating to route communications between the UEs and network node 1210*b*, but which is additionally capable of operating as a communication start and/or end point for certain data channels.

Figure 13:
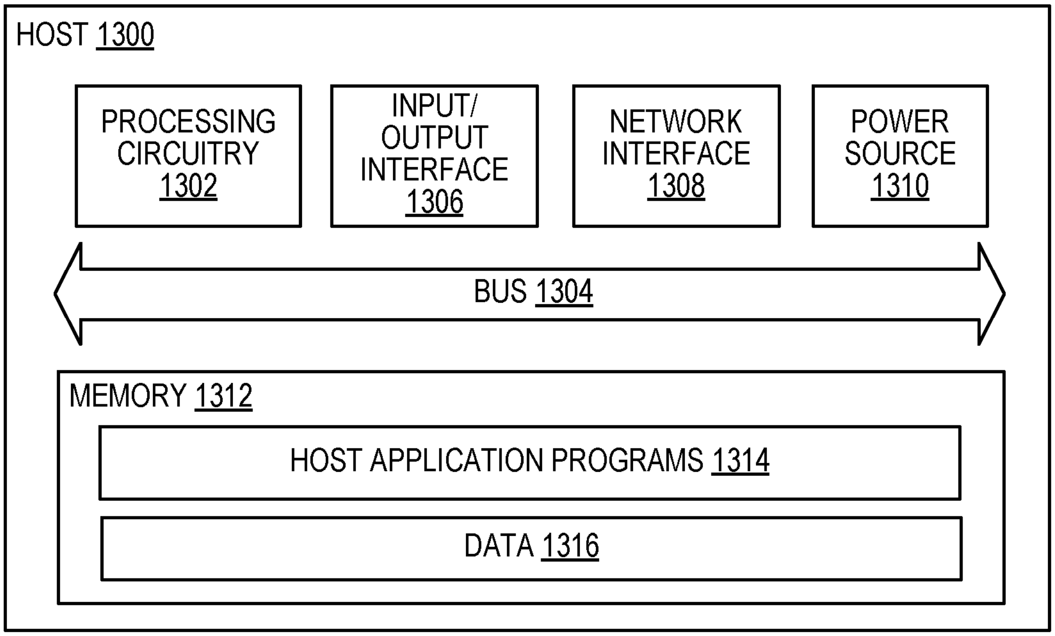
FIG. 13 is a block diagram of a host which may be an embodiment of the host of FIG. 12, in accordance with various aspects described herein.

FIG. 13 is a block diagram of a host 1300, which may be an embodiment of the host 1216 of FIG. 12, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 13 and QQ3, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Notably, modifications and other embodiments of the present disclosure will come to mind to one skilled in the art having the benefit of the teachings presented in the foregoing descriptions and the associated drawings. Therefore, it is to be understood that the present disclosure is not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a path computation engine for computing a path over which data is to be conveyed in a communication network, the method comprising:

obtaining, for each of one or more nodes that are candidates for including in the path:

a vulnerability score set which includes one or more common vulnerability scores for one or more security vulnerabilities applicable to the node, with the common vulnerability score for a security vulnerability quantifying an extent to which the security vulnerability is exploitable and/or impactful; and a remediation level set which includes one or more remediation levels for the one or more security vulnerabilities that are applicable to the node, with the remediation level for a security vulnerability quantifying an extent to which the node has remediated the security vulnerability;

wherein the one or more vulnerability score sets and/or the one or more remediation level sets are obtained dynamically from one or more data repositories, with any given vulnerability score set or remediation level set being obtained upon update or addition of that vulnerability score set or remediation level set by the one or more data repositories, and wherein computing the path comprises updating a previous computation of the path upon obtaining one or more new or updated vulnerability score sets or upon obtaining one or more new or updated remediation level sets;

computing the path as a function of the one or more vulnerability score sets and the one or more remediation level sets, wherein said computing comprises:

for each of the one or more nodes, calculating, as a function of the remediation level set and the vulnerability score set obtained for the node, a metric that characterizes how secure the node is against the one or more security vulnerabilities that are applicable to the node, accounting for the respective extents to which those one or more security vulnerabilities are exploitable and/or impactful and accounting for the respective extents to which the node has remediated those one or more security vulnerabilities; and determining the path as a function of the one or more metrics calculated for the one or more nodes.

2. The method of claim 1, wherein, for each of the one or more nodes, the metric calculated for that node is independent of any remediation level set obtained for any other node among the one or more nodes.

3. The method of claim 1, wherein, for each of the one or more nodes, calculating the metric comprises:

for each of the one or more security vulnerabilities that are applicable to the node, calculating, as a function of the common vulnerability score and the remediation level for that security vulnerability, a vulnerability-specific metric for the node characterizing how secure the node is against the security vulnerability accounting for the extent to which the security vulnerability is exploitable and/or impactful and accounting for the extent to which the node has remediated the security vulnerability; and calculating the metric for the node as a combination of the one or more vulnerability-specific metrics for the node.

4. The method of claim 3, wherein the one or more nodes comprise N nodes, N≥1, wherein the one or more security vulnerabilities that are applicable to the jth node comprise M security vulnerabilities, M≥1, wherein the vulnerability-specific metric for the jth node, with $j \in \{1 \ldots N\}$, is calculated as:

$$P_{ij} = \frac{X_{ij}}{Z}$$

where $P_{ij}$ is the vulnerability-specific metric for the jth node and the ith security vulnerability, with $i \in \{1 \ldots M\}$, $X_{ij}$ is a remediation-aware security parameter that characterizes how secure the jth node is against the ith security vulnerability accounting for the extent to which the security vulnerability is exploitable and/or impactful and accounting for the extent to which the node has remediated the ith security vulnerability, and Z is a remediation-independent normalizing factor that is independent of any remediation level obtained for any other node among the one or more nodes.

5. The method of claim 4, wherein the vulnerability-specific metric for the jth node is calculated as:

$$P_{ij} = \frac{X_{ij}}{Z} = \frac{\alpha_{ij} * CVS_i / RE_{ij}}{\sum_{i=1,j=1}^{m,n} \alpha_{ij} * CVS_i},$$

where $CVS_i$ is the common vulnerability score obtained for the ith security vulnerability, $RE_{ij}$ is the remediation level obtained for the jth node and the ith security vulnerability, and $\alpha_{ij}$ is a tuning parameter for the jth node and the ith security vulnerability.

6. The method of claim 3, wherein calculating the metric for the node as a combination of the one or more vulnerability-specific metrics for the node comprises calculating the metric for the node as:

$$P_j = \sum_{i=1}^{M} P_{ij}$$

where $P_{ij}$ is the vulnerability-specific metric for the jth node and the ith security vulnerability.

7. The method of claim 1, wherein determining the path as a function of the one or more metrics comprises solving an optimization problem that optimizes one or more criterions for the path, subject to one or more constraints, wherein the one or more criterions for the path include a security of the path, wherein optimizing the security of the path comprises maximizing or minimizing the sum of the metrics calculated for the nodes included in the path.

8. The method of claim 7, wherein the one or more criterions include a bandwidth of the path and/or a latency of the path, and/or wherein the one or more constraints include a constraint on a bandwidth of the path and/or a constraint on a latency of the path.

9. The method of claim 1, wherein a common vulnerability score is a Common Vulnerability Scoring System (CVSS) score.

10. The method of claim 1, further comprising setting up the path computed.

11. The method of claim 1, wherein the path is a label-switched path in a Multi-Protocol Label Switching (MPLS) network or a Generalized MPLS (GMPLS) network.

12. A path computation engine configured to compute a path over which data is to be conveyed in a communication network, the path computation engine comprising processing circuitry configured to:

obtain, for each of one or more nodes that are candidates for including in the path:

a vulnerability score set which includes one or more common vulnerability scores for one or more security vulnerabilities applicable to the node, with the common vulnerability score for a security vulnerability quantifying an extent to which the security vulnerability is exploitable and/or impactful; and a remediation level set which includes one or more remediation levels for the one or more security vulnerabilities that are applicable to the node, with the remediation level for a security vulnerability quantifying an extent to which the node has remediated the security vulnerability;

wherein the one or more vulnerability score sets and/or the one or more remediation level sets are obtained dynamically from one or more data repositories, with any given vulnerability score set or remediation level set being obtained upon update or addition of that vulnerability score set or remediation level set by the one or more data repositories, and wherein computing the path comprises updating a previous computation of the path upon obtaining one or more new or updated vulnerability score sets or upon obtaining one or more new or updated remediation level sets;

compute the path as a function of the one or more vulnerability score sets and the one or more remediation level sets, by:

for each of the one or more nodes, calculating, as a function of the remediation level set and the vulnerability score set obtained for the node, a metric that characterizes how secure the node is against the one or more security vulnerabilities that are applicable to the node, accounting for the respective extents to which those one or more security vulnerabilities are exploitable and/or impactful and accounting for the respective extents to which the node has remediated those one or more security vulnerabilities; and determining the path as a function of the one or more metrics calculated for the one or more nodes.

13. The path computation engine of claim 12, wherein, for each of the one or more nodes, the metric calculated for that node is independent of any remediation level set obtained for any other node among the one or more nodes.

14. The path computation engine of claim 12, wherein, for each of the one or more nodes, the processing circuitry is configured to calculate the metric by:

for each of the one or more security vulnerabilities that are applicable to the node, calculating, as a function of the common vulnerability score and the remediation level for that security vulnerability, a vulnerability-specific metric for the node characterizing how secure the node is against the security vulnerability accounting for the extent to which the security vulnerability is exploitable and/or impactful and accounting for the extent to which the node has remediated the security vulnerability; and calculating the metric for the node as a combination of the one or more vulnerability-specific metrics for the node.

15. The path computation engine of claim 14, wherein the one or more nodes comprise N nodes, N≥1, wherein the one or more security vulnerabilities that are applicable to the jth node comprise M security vulnerabilities, M≥1, wherein the vulnerability-specific metric for the jth node, with j∈{1 . . . . N}, is calculated as:

$$P_{ij} = \frac{X_{ij}}{Z}$$

where $P_{ij}$ is the vulnerability-specific metric for the jth node and the ith security vulnerability, with i∈{1 . . . . M}, $X_{ij}$ is a remediation-aware security parameter that characterizes how secure the jth node is against the ith security vulnerability accounting for the extent to which the security vulnerability is exploitable and/or impactful and accounting for the extent to which the node has remediated the ith security vulnerability, and Z is a remediation-independent normalizing factor that is independent of any remediation level obtained for any other node among the one or more nodes.

16. The path computation engine of claim 15, wherein the vulnerability-specific metric for the jth node is calculated as:

$$P_{ij} = \frac{X_{ij}}{Z} = \frac{\alpha_{ij} * CVS_i / RE_{ij}}{\sum_{i=1,j=1}^{m,n} \alpha_{ij} * CVS_i},$$

where $CVS_i$ is the common vulnerability score obtained for the ith security vulnerability, $RE_{ij}$ is the remediation level obtained for the jth node and the ith security vulnerability, and $\alpha_{ij}$ is a tuning parameter for the jth node and the ith security vulnerability.

17. The path computation engine of claim 14, wherein the processing circuitry is configured to calculate the metric for the node as a combination of the one or more vulnerability-specific metrics for the node by calculating the metric for the node as:

$$P_j = \sum_{i=1}^{M} P_{ij}$$

where $P_{ij}$ is the vulnerability-specific metric for the jth node and the ith security vulnerability.

18. The path computation engine of claim 12, wherein the processing circuitry is configured to determine the path as a function of the one or more metrics by solving an optimization problem that optimizes one or more criterions for the path, subject to one or more constraints, wherein the one or more criterions for the path include a security of the path, wherein optimizing the security of the path comprises maximizing or minimizing the sum of the metrics calculated for the nodes included in the path.

19. The path computation engine of claim 18, wherein the one or more criterions include a bandwidth of the path and/or a latency of the path, and/or wherein the one or more constraints include a constraint on a bandwidth of the path and/or a constraint on a latency of the path.

20. A computer readable storage medium containing a computer program comprising instructions which, when executed by at least one processor of a path computation engine, causes the path computation engine to:

obtain, for each of one or more nodes that are candidates for including in the path:

a vulnerability score set which includes one or more common vulnerability scores for one or more security vulnerabilities applicable to the node, with the common vulnerability score for a security vulnerability quantifying an extent to which the security vulnerability is exploitable and/or impactful; and a remediation level set which includes one or more remediation levels for the one or more security vulnerabilities that are applicable to the node, with the remediation level for a security vulnerability quantifying an extent to which the node has remediated the security vulnerability;

wherein the one or more vulnerability score sets and/or the one or more remediation level sets are obtained dynamically from one or more data repositories, with any given vulnerability score set or remediation level set being obtained upon update or addition of that vulnerability score set or remediation level set by the one or more data repositories, and wherein computing the path comprises updating a previous computation of the path upon obtaining one or more new or updated vulnerability score sets or upon obtaining one or more new or updated remediation level sets;

compute the path as a function of the one or more vulnerability score sets and the one or more remediation level sets, by:

for each of the one or more nodes, calculating, as a function of the remediation level set and the vulnerability score set obtained for the node, a metric that characterizes how secure the node is against the one or more security vulnerabilities that are applicable to the node, accounting for the respective extents to which those one or more security vulnerabilities are exploitable and/or impactful and accounting for the respective extents to which the node has remediated those one or more security vulnerabilities; and determining the path as a function of the one or more metrics calculated for the one or more nodes.

* * * * *